(12) United States Patent
Singh et al.

(10) Patent No.: US 10,614,455 B2
(45) Date of Patent: Apr. 7, 2020

(54) METHOD FOR MODIFYING TRANSACTION CREDENTIALS

(71) Applicant: MASTERCARD ASIA/PACIFIC PTE LTD, Singapore (SG)

(72) Inventors: Harjender Singh, Singapore (SG); Syam Sasidharan Nair, Singapore (SG); Philip Wei Ping Yen, Singapore (SG); Michihiko Yoden, Singapore (SG)

(73) Assignee: MASTERCARD ASIA/PACIFIC PTE. LTD. (SG)

( * ) Notice: Subject to any disclaimer, the term of this patent is extended or adjusted under 35 U.S.C. 154(b) by 165 days.

(21) Appl. No.: 15/240,347

(22) Filed: Aug. 18, 2016

(65) Prior Publication Data

US 2017/0053272 A1 Feb. 23, 2017

(30) Foreign Application Priority Data

Aug. 21, 2015 (SG) .......................... 10201506663Q

(51) Int. Cl.
*G06Q 20/02* (2012.01)
*G06Q 20/38* (2012.01)
(Continued)

(52) U.S. Cl.
CPC ....... *G06Q 20/3821* (2013.01); *G06Q 20/327* (2013.01); *G06Q 30/0226* (2013.01);
(Continued)

(58) Field of Classification Search
CPC ...................................... G06Q 30/0207–0277
See application file for complete search history.

(56) References Cited

U.S. PATENT DOCUMENTS 6,292,786 B1 * 9/2001 Deaton .............. G06Q 20/0457
705/14.25
8,751,314 B2 * 6/2014 Fisher .................... H04W 4/21
705/16
(Continued)

FOREIGN PATENT DOCUMENTS

CN 102222295 A 10/2011
WO 2012134880 A1 10/2012
(Continued)

OTHER PUBLICATIONS

International Search Report and Written Opinion of the International Searching Authority (Forms PCT/ISA/210 and PCT/ISA/237) dated Nov. 2, 2016, in the corresponding international Application No. PCT/SG2016/050391. (10 pages).

*Primary Examiner* — David J Stoltenberg
(74) *Attorney, Agent, or Firm* — Buchanan Ingersoll & Rooney PC

(57) ABSTRACT

Disclosed is a method for modifying transaction credentials. The method involves initiating a transaction at a receiving terminal, the transaction being defined by one or more transaction credentials and then transmitting mobile terminal data from a mobile terminal, via the receiving terminal, to a server, the mobile terminal data comprising a set of account data relating to the mobile terminal. Subsequently, the method involves extracting the set of account data at least partially from the mobile terminal data at the server and transmitting the set of account data from the server to an account manager, the set of account data being associated with a unique consumer account managed by the account manager. One or more transaction modifiers associated with the consumer account are then received at the receiving (Continued)

terminal which modifies at least one of the one or more transaction credentials based on the one or more transaction modifiers.

15 Claims, 25 Drawing Sheets

(51) Int. Cl.
| | | |
|---|---|---|
| *H04W 12/06* | (2009.01) | |
| *H04W 12/08* | (2009.01) | |
| *G06Q 30/02* | (2012.01) | |
| *G06Q 20/32* | (2012.01) | |
| *H04L 29/06* | (2006.01) | |
| *H04W 12/00* | (2009.01) | |

(52) U.S. Cl.
CPC ......... *H04L 63/0807* (2013.01); *H04W 12/06* (2013.01); *H04W 12/08* (2013.01); *H04W 12/00512* (2019.01)

(56) References Cited

U.S. PATENT DOCUMENTS

| | | | | |
|---|---|---|---|---|
| 9,524,499 B2* | 12/2016 | Granbery | G06Q 20/20 | |
| 2005/0160003 A1* | 7/2005 | Berardi | G06Q 20/00 | 705/14.17 |
| 2009/0298427 A1* | 12/2009 | Wilkinson | G06Q 20/20 | 455/41.1 |
| 2010/0174596 A1* | 7/2010 | Gilman | G06Q 20/387 | 705/14.23 |
| 2011/0125566 A1* | 5/2011 | McLaughlin | G06Q 20/20 | 705/14.23 |
| 2011/0231238 A1* | 9/2011 | Khan | G06Q 20/0655 | 705/14.26 |
| 2011/0307318 A1* | 12/2011 | LaPorte | G06Q 20/209 | 705/14.33 |
| 2012/0150601 A1* | 6/2012 | Fisher | H04W 4/21 | 705/14.23 |
| 2012/0191522 A1* | 7/2012 | McLaughlin | G06Q 50/01 | 705/14.23 |
| 2012/0271697 A1* | 10/2012 | Gilman | G06Q 20/387 | 705/14.23 |
| 2012/0296722 A1* | 11/2012 | Gosavi | G06Q 30/0233 | 705/14.23 |
| 2012/0296726 A1* | 11/2012 | Dessert | G06Q 30/0268 | 705/14.27 |
| 2013/0080219 A1* | 3/2013 | Royyuru | G06Q 30/00 | 705/14.1 |
| 2013/0080230 A1* | 3/2013 | Fisher | H04W 4/21 | 705/14.23 |
| 2013/0275307 A1* | 10/2013 | Khan | G06Q 20/40 | 705/64 |
| 2013/0317927 A1* | 11/2013 | Bush | G06Q 20/3278 | 705/21 |
| 2014/0032297 A1* | 1/2014 | Germann | G06Q 30/0226 | 705/14.26 |
| 2014/0058815 A1* | 2/2014 | Hiremath | G06Q 30/0215 | 705/14.17 |
| 2014/0108263 A1* | 4/2014 | Ortiz | G06Q 20/3278 | 705/71 |
| 2014/0122097 A1* | 5/2014 | Taylor | G06Q 30/0207 | 705/2 |
| 2014/0172577 A1* | 6/2014 | Rephlo | G06Q 20/322 | 705/14.64 |
| 2014/0207670 A1* | 7/2014 | Matotek | G06Q 20/20 | 705/41 |
| 2014/0330626 A1* | 11/2014 | Fisher | H04W 4/21 | 705/14.23 |
| 2014/0330628 A1* | 11/2014 | Chen | G06Q 30/02 | 705/14.25 |
| 2014/0372234 A1* | 12/2014 | Tikku | G06Q 20/202 | 705/21 |
| 2015/0032524 A1* | 1/2015 | Fisher | H04W 4/21 | 705/14.23 |
| 2015/0046240 A1* | 2/2015 | Moreton | G06Q 30/0215 | 705/14.17 |
| 2015/0058129 A1* | 2/2015 | Nevid | G06Q 30/0269 | 705/14.64 |
| 2015/0095125 A1* | 4/2015 | Ohashi | G06Q 50/01 | 705/14.12 |
| 2015/0151203 A1* | 6/2015 | Kurosawa | G07F 17/32 | 463/42 |
| 2015/0186879 A1* | 7/2015 | Ortiz | G06Q 20/3278 | 705/71 |
| 2015/0287037 A1* | 10/2015 | Salmon | G06Q 20/4016 | 705/44 |
| 2015/0317663 A1* | 11/2015 | Chinoy | G06Q 30/0238 | 705/14.26 |
| 2016/0019513 A1* | 1/2016 | Sugiyama | G06Q 20/20 | 705/14.65 |
| 2016/0027013 A1* | 1/2016 | Modi | G06Q 30/04 | 705/65 |
| 2016/0034876 A1* | 2/2016 | Speiser | G06Q 30/06 | 705/21 |
| 2016/0125449 A1* | 5/2016 | Beatty | G06Q 30/0238 | 705/14.38 |
| 2016/0189196 A1* | 6/2016 | Huh | G06Q 30/0231 | 705/14.31 |
| 2016/0260085 A1* | 9/2016 | Yen | G06Q 20/327 | |
| 2016/0260117 A1* | 9/2016 | Yen | G06Q 20/3278 | |
| 2016/0275560 A1* | 9/2016 | Ito | G06Q 30/0207 | |
| 2017/0076560 A1* | 3/2017 | Dasilva | G06Q 10/06 | |
| 2017/0344971 A1* | 11/2017 | Kargman | G06Q 50/12 | |
| 2018/0096314 A1* | 4/2018 | Nair | G06Q 20/0453 | |

FOREIGN PATENT DOCUMENTS

| | | |
|---|---|---|
| WO | 2013155536 A1 | 10/2013 |
| WO | 2014054003 A1 | 4/2014 |

* cited by examiner

METHOD FOR MODIFYING TRANSACTION CREDENTIALS

FIELD OF INVENTION

The present invention relates broadly, but not exclusively, to a method for modifying transaction credentials. Such a method can be applied in various contexts, including electronic transactions, cash and credit card transactions.

BACKGROUND

The capabilities of smart phones, or mobile phones with an advanced mobile operating system, are increasingly being tapped by merchants to sell their goods or services or both. Smart phones (or hereafter referred to as "mobile terminals") are useful to merchants because such mobile terminals are able to host applications ("mobile applications") that allow for electronic payment of goods and/or services, through the use of digital wallet technology; as well as being able to support value added services, which include coupon or offers and loyalty programs. Examples of a coupon or offer is a ticket or document that can be exchanged for a financial discount or rebate when purchasing a product and/or service while a loyalty program are structured marketing efforts that reward, and therefore encourage, loyal buying behaviour from the same merchant.

While mobile applications are able to facilitate a more frictionless shopping experience, by for example replacing the traditional method of carrying a credit card to make the purchase, a separate loyalty card to keep track of points earned from a purchase or physical vouchers to redeem discounts on a purchase, one problem with their adoption is their compatibility with merchant in-store systems. Each mobile application may use a standard that is compatible with a particular merchant, but may not be compatible with that used by another merchant. Even mobile applications that are designed for communication with the same merchant may not use the same standard.

There is also an inherent difficulty faced by small to medium enterprises and small merchants, in that provision of value added services often requires significant upfront capital outlay, for infrastructure purchase and account creation, to electronically implement and manage value added services.

There is thus a need to implement standards and solutions that enable more merchants to accept in-store transactions (both digital payment and value added service redemption) performed by mobile applications by establishing an open-loop modularized architecture, and/or to provide access for more merchants to the services of premium value added services providers.

SUMMARY

According to a first aspect of the present invention, there is provided a method for modifying transaction credentials, comprising:
  initiating a transaction at a receiving terminal, the transaction being defined by one or more transaction credentials;
  transmitting mobile terminal data from a mobile terminal, via the receiving terminal, to a server, the mobile terminal data comprising a set of account data relating to the mobile terminal;
  extracting the set of account data at least partially from the mobile terminal data at the server;
  transmitting the set of account data from the server to an account manager, the set of account data being associated with a unique consumer account managed by the account manager;
  receiving, at the receiving terminal, one or more transaction modifiers associated with the consumer account; and
  modifying at least one of the one or more transaction credentials based on the one or more transaction modifiers.

According to a second aspect of the present invention, there is provided a system for modifying transaction credentials, comprising a receiving terminal and server:
  the server comprising:
    at least one server processor; and
    at least one server memory including server computer program code;
    the at least server one memory and the server computer program code configured to, with the at least one processor, cause the server at least to:
      receive mobile terminal data from a mobile terminal, via the receiving terminal, the mobile terminal data comprising a set of account data relating to the mobile terminal;
      extract a set of account data at least partially from the mobile terminal data at the server;
      transmit the set of account data to an account manager, the set of account data being associated with a unique consumer account managed by the account manager; and
      receive from the account manager, and forward to the receiving terminal, one or more transaction modifiers associated with the consumer account; and
  the receiving terminal comprising:
    at least one receiving terminal processor; and
    at least one receiving terminal memory including receiving terminal computer program code;
    the at least one receiving terminal memory and the receiving terminal computer program code configured to, with the at least one receiving terminal processor, cause the receiving terminal at least to:
      initiate a transaction defined by one or more transaction credentials;
      receive the mobile terminal data from the mobile terminal and transmit the mobile terminal data to the server;
      receive the one or more transaction modifiers from the server; and
      modify at least one of the one or more transaction credentials based on the one or more transaction modifiers.

According to a third aspect of the present invention, there is provided a server facilitating modification of transaction credentials, the server communicating with one or more receiving terminals at which a transaction is initiated, the transaction being defined by the transaction credentials, and the server communicating with an account manager, the server comprising:
  a processor;
  at least one memory including computer program code, the at least one memory and the computer program code configured to, with the at least one processor, cause the server at least to:

receive mobile terminal data from a mobile terminal, via the receiving terminal, the mobile terminal data comprising a set of account data relating to the mobile terminal;

extract a set of account data at least partially from the mobile terminal data at the server, and identify an account manager associated with the account data, the account manager managing a unique consumer account associated with the set of account data;

transmit the set of account data to the account manager; and receive, from the account manager, and forward to the receiving terminal, one or more transaction modifiers associated with the consumer account.

According to a fourth aspect of the present invention, there is provided a non-transitory computer readable medium having stored thereon executable instructions to have a server and receiving terminal facilitate modification of transaction credentials, the executable instructions controlling the server to perform steps comprising:

receiving mobile terminal data from a mobile terminal, via a receiving terminal, the mobile terminal data comprising a set of account data relating to the mobile terminal;

extracting a set of account data at least partially from the mobile terminal data;

transmitting the set of account data to an account manager, the set of account data being associated with a unique consumer account managed by the account manager; and receiving from the account manager, and forward to the receiving terminal, one or more transaction modifiers associated with the consumer account, the executable instructions controlling the receiving terminal to perform steps comprising:

initiating a transaction defined by one or more transaction credentials;

receiving the mobile terminal data from the mobile terminal and transmit the mobile terminal data to the server;

receiving the one or more transaction modifiers from the server; and modifying at least one of the one or more transaction credentials based on the one or more transaction modifiers.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1A:
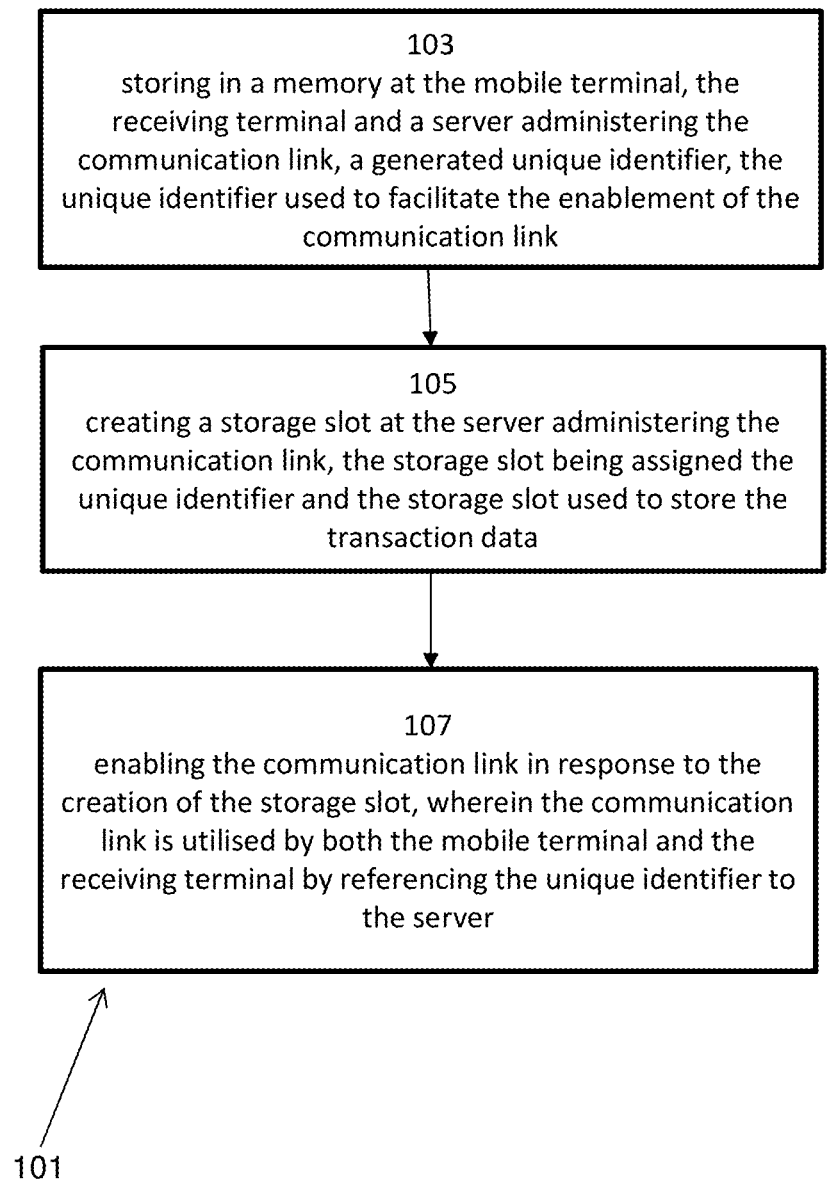
FIG. 1A shows a method for enabling a communication link over which transaction data is transmitted between a mobile terminal and a receiving terminal.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a conventional computer will appear from the description below.

In addition, the present specification also implicitly discloses a computer program, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1A shows a method 101, in accordance with one embodiment of the invention, for enabling a communication link over which transaction data is transmitted between a mobile terminal and a receiving terminal. The communication link is administered by a server.

The mobile terminal may be a smart phone with an advanced mobile operating system, such as Android of Google Inc. or iOS of Apple Inc. The operating system hosts one or more applications, where one or more of these applications are used to enable the communication link of the method 101.

Mobile terminals typically operate one or more mobile apps enabling created by a particular merchant or value added service provider. Where a mobile app, or any other set of computer readable instructions such as a program, applet or application is described with reference to the mobile terminal, that set of computer readable instructions may be downloaded (e.g. from an app store such as Google Play® or iTunes®) and installed on the mobile terminal. That set of instructions may instead be pre-installed on the mobile terminal before provision of the mobile terminal to a consumer, or may be presented on the mobile terminal by any other mechanism and the present teachings are not limited only to the particular mechanisms disclosed herein.

The receiving terminal may be either a payment terminal or a POS (point of sale) terminal. The payment terminal is a device typically used to interface with payment cards, such as credit and debit cards. The payment terminal may also include a NFC (Near Field Communication) transceiver that receives and transmits data from and to the mobile terminal so as to cater for payment, for example through the use of a digital wallet which stores one or more credit or debit cards in electronic form. The NFC transceiver may also be used not only to facilitate such digital wallet payment, but also receive data used in a value added service transaction initiated by the mobile terminal, wherein such data is typically sent to the POS terminal for further processing. Therefore, the payment terminal may be a standalone device or may be connected to the POS terminal. The POS terminal is a system that may include a computer, a cash register and other equipment that supports functions like inventory management and integration with a merchant backend system. The transaction data refers to data generated during a transaction for purchase of goods and/or services, wherein the transaction is typically initiated by use of the mobile terminal to purchase selected goods and/or services.

The receiving terminal may also comprise a scanner for scanning a QR (quick response) code displayed on the mobile terminal, for executing methods described herein. The receiving terminal may instead be configured to display a QR-code for scanning at the mobile terminal, to facilitate and/or execute a transaction at the receiving terminal.

The method 101 comprises the steps 103, 105 and 107 which are explained in further detail below.

In the step 103, a generated unique identifier is stored in a memory at the mobile terminal, the receiving terminal and the server administering the communication link. The unique identifier is used to facilitate the enablement of the communication link.

The unique identifier may take any desired form. For example, the unique identifier may comprise a unique character string, integer, binary number or other data type. The unique identifier may be independent of the mobile terminal, receiving terminal and server (e.g. a random number or a pseudo-random number or other computationally generated identifier or code). The unique identifier may instead be dependent on one of the mobile terminal, receiving terminal and server. For example, where the mobile terminal is a smartphone the unique identifier may be an International Mobile Station Equipment Identity (IMEI) uniquely associated with the smartphone. In this sense, generating the unique identifier comprises identifying a unique identifier from one of the mobile terminal and the receiving terminal. While a unique identifier may also be identified on the server, it is envisaged that the server will be used will multiple merchants for a large number of transactions and that there may be only a limited number of unique identifiers available on the server (e.g. server hardware numbers) such that identifiers will need to be reused, thus rendering them non-unique.

The unique identifier may be generated by any one of the mobile terminal, the receiving terminal and the server, wherein the generated unique identifier is then received by the other two of the mobile terminal, the receiving terminal and the server for storage in their respective memory. In a preferred embodiment, the one of the mobile terminal, the receiving terminal and the server that generates the unique identifier will then transmit the generated unique identifier to one of the other two of the mobile terminal, the receiving terminal and the server, which will in turn transmit the received unique identifier to the remaining one of the mobile terminal, the receiving terminal and the server. In this manner, all of the mobile terminal, the receiving terminal and the server receive the unique identifier used to facilitate the enablement of the communication link. For example, the mobile terminal may generate the unique identifier and transmit the unique identifier to the receiving terminal, whereby the server receives the unique identifier from the receiving terminal before or during allocation of memory—at the server—for managing the transaction (e.g. the creation of a storage slot), the memory allocation or storage slot being described in further detail in step 105.

In another example, the receiving terminal may generate the unique identifier and transmit the unique identifier to the mobile terminal, whereby the server receives the unique identifier from the mobile terminal before or during memory allocation.

In another example, the server may generate the unique identifier before or during memory allocation and transmit the unique identifier to the mobile terminal and receiving terminal.

In another embodiment, the one of the mobile terminal, the receiving terminal and the server that generates the unique identifier will then transmit the generated unique identifier to both of the other two of the mobile terminal, the receiving terminal and the server.

The memory may be allocated in response to receipt of the unique identifier, as the unique identifier is received, or in anticipation of receipt of the unique identifier. In either case, once the unique identifier has been received by, or generated by, the server and the memory has been allocated, the unique identifier is associated (e.g. assigned to) with the allocated memory. The allocated memory is then used to store transaction data—e.g. a ticket amount, a date of transaction and/or a time of transaction; a receipt of the transaction and details of the purchased goods and/or services; and data used to facilitate redemption of value added services or indicative of the modification to the transaction data resulting from use or redemption of value added services (e.g. use of a coupon or loyalty points). Transaction data may also include data identifying the mobile terminal, the receiving terminal, a value added service provider whose services were employed during the transaction such as by application of a discount or accumulation of loyalty points.

The receipt of the unique identifier by both the mobile terminal and the receiving terminal pairs these two terminals. The unique identifier provides a means for either one of the mobile terminal and the receiving terminal to recognize that it is communicating with the other one of the mobile terminal and receiving terminal. The unique identifier also provides a means to call up transaction data exchanged between the mobile terminal and the receiving terminal. For example, the unique identifier may be used to locate a past transaction at a future date, whether or not that transaction succeeded or failed—in other words was executed or not executed. The term "unique identifier" may be used interchangeably with the term "pairing identifier".

In the step 105, memory is allocated at the server administering the communication link. For illustrative purposes, the memory that is allocated at the server may hereinafter be referred to as a storage slot. The term 'slot' will be understood to encompass a single, continuous region of memory as well as multiple regions of memory in a distributed storage environment, and other storage regimes. Moreover, the term "storage slot" may be used interchangeably with the term "pairing slot".

The storage slot may be allocated before receipt of the unique identifier, after receipt of the unique identifier or at the same time as the unique identifier is received.

The storage slot is assigned the unique identifier generated at step 103. This assignment may be used to initiate creation of the storage slot in that such a storage slot would not be reserved for the communication link unless a unique identifier is to be assigned to it. Assignment may be effected by the storage slot storing the unique identifier. The storage slot is also used to store the transaction data discussed below.

The storage slot thus acts as a means to indicate that a channel is allocated for the communication link. The storage slot also provides a repository, in the server, for the transaction data transmitted between the mobile terminal and the receiving terminal. By storing the transaction data in the storage slot, a record of the transaction data is kept and readily accessed by either of the mobile terminal or the receiving terminal. The storage slot may be assigned the unique identifier, so that access to the storage slot may be gained by referencing the unique identifier. Similarly, past transactions may be recalled (i.e. called or extracted from memory) with reference to the unique identifier, where the server stores historical transaction data. In one embodiment, only certain portions of the transaction data are kept in the storage slot, i.e. it is not a necessity of the storage slot to keep a record of all of the transaction data.

In step 107, the communication link is enabled in response to the creation of the storage slot. This is a result of there now being memory allocated to store transaction data generated and transmitted over the communication link.

The enablement of the communication link establishes a channel for the transaction data to be transmitted between the mobile terminal and the receiving terminal. The communication link is utilised by both the mobile terminal and the receiving terminal by referencing the unique identifier to the server, i.e. when one of the mobile terminal or the receiving terminal needs to send transaction data to the other, the channel allocated for the communication link is located through the use of the unique identifier.

The method 101 may not necessarily follow the sequence as shown in FIG. 1A. For example, either of the receiving terminal, the mobile terminal or both may store the unique identifier before the storage slot is created at the server. This approach is described in further detail with respect to FIG. 2. In an alternative approach, step 105 may be executed before step 103 is executed. For example, either of the mobile terminal, the receiving terminal or both may store the unique identifier after the storage slot is created at the server. This approach is described in further detail with respect to FIG. 5.

The receiving terminal, mobile terminal and server may also be used to modify transaction credentials. Transaction credentials may include one or more of the ticket amount, loyalty or reward points accumulated by execution of a transaction, loyalty or reward points redeemed during a transaction, coupon amount, coupon source, discount amount, reason for discount and any other credential that may be used to modify a transaction from a default transaction—in other words, the transaction data that would apply if, for example, no loyalty or rewards scheme, discount or coupon were involved.

The transaction credentials may be the same as the transaction data. It is envisaged that the transaction credentials will often be a subset of the transaction data. For example, the transaction data may include additional data. The additional data may include the date of the transaction, the parties to the transaction, and the payment vehicle (e.g. credit card, debit card, cash or cash equivalent) used to effect the transaction. Thus, the phrase "modify transaction credentials" may similarly be restated as "modify transaction data".

Figure 1B:
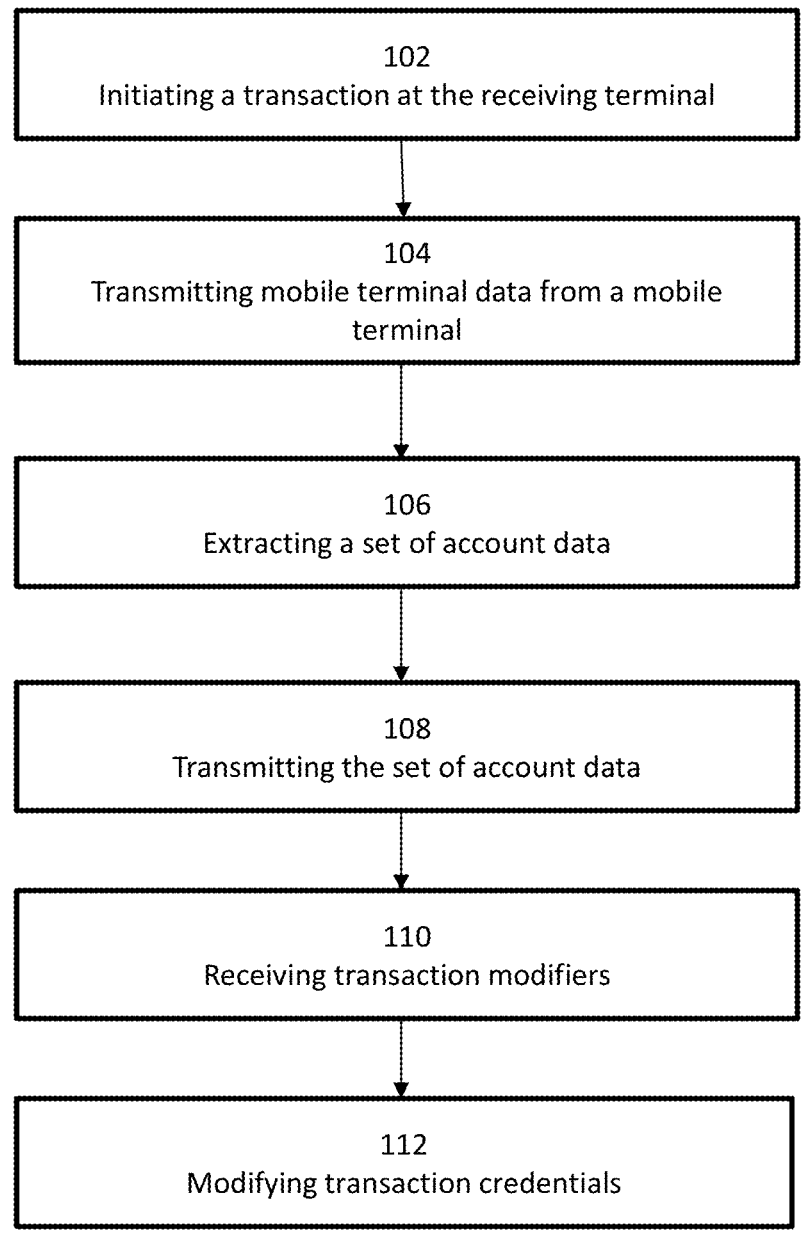
FIG. 1B shows a method for modifying transaction credentials.

In a broad sense, a method 100 for modifying transaction credentials as shown in FIG. 1B, may include:

step 102: initiating a transaction at a receiving terminal;

step 104: transmitting mobile terminal data from a mobile terminal, via the receiving terminal, to a server;

step 106: extracting a set of account data from the mobile terminal data;

step 108: transmitting the set of account data to an account manager;

step 110: receiving transaction modifiers; and step 112: modifying transaction credentials based the transaction modifiers.

Step 102 involves initiating a transaction at a receiving terminal. The transaction is initiated after a consumer determines the goods or services the consumer wishes to purchase, and the cost of those goods or services are then tallied at the receiving terminal.

Initiating a transaction results in a ticket amount being generated at the receiving terminal. The ticket amount is the amount required to pay for goods and/or services for which the transaction is being made. The transaction is thus defined by one or more transaction credentials, as mentioned above, one of which is the ticket amount. The ticket amount may subsequently be settled (i.e. paid) using cash, a credit or debit card, digital wallet or any other mechanism.

Step 104 involves transmitting mobile terminal data. The mobile terminal data is generated such that coupons, discounts, loyalty awards and the like (hereinafter referred to as value-added service modifiers, or "VAS modifiers") that are associated with the mobile terminal can be identified and applied to the transaction to modify credentials of the transaction. In the present context the phrase "associated with the terminal", and similar, includes within its scope VAS modifiers that are associated with the consumer controlling the mobile terminal, such as through a loyalty awards account managed by a VAS provider.

The mobile terminal data is transmitted from a mobile terminal, via the receiving terminal, to a server. The mobile terminal data is generated by the mobile terminal. The mobile terminal data may be generated in response to a call from the receiving terminal or server to an applet on the mobile terminal. The mobile terminal data may instead be generated in response to selection of a program, such as by a consumer touching an app icon on the touchscreen on their smartphone. The app may be provided by a third party value-added service provider (i.e. an account manager such as a "VAS provider") such as Epsilon, Kobie Marketing, Maritz Loyalty Marketing or Aimia. The app may alternatively be created by the merchant associated with the receiving terminal—in other words, the merchant from whom the goods or services are to be purchased. The app may alternatively be supplied by any other third party. In general, the app will be related to the merchant and thus to the receiving terminal to which the mobile terminal data is sent.

The mobile terminal data comprises a set of account data relating to the mobile terminal. The account data uniquely identifies a particular account maintained or managed by a VAS provider. The account data thus enables VAS modifiers associated with the particular account to be applied to transactions made with a particular merchant or merchants.

The mobile terminal data may be transmitted to the receiving terminal with other data, in a single data transmission. For example, the mobile terminal data may be supplied along with the unique identifier described in relation to FIG. 1A, during a NFC transmission or via QR-code. The mobile terminal data may also be supplied with digital wallet payment data in a transmission from the mobile terminal to the receiving terminal.

The receiving terminal forwards the mobile terminal data to the server so that account data can be extracted from the mobile terminal data, at the server. In this sense the receiving terminal may act as an intermediary, performing no processing function on the data. Instead, the receiving terminal may receive the mobile terminal data as forward that data, as received, to the server for processing. Since the receiving terminal is already in data communication with the server, no additional physical or virtual infrastructure may be required.

The receiving terminal may also send additional information with the mobile terminal data, to the server. For example, the receiving terminal may send information about the loyalty schemes with which the merchant is registered. The set of account data may comprise one or more data points extracted from the additional data.

At step 106, the server extracts a set of account data from the mobile terminal data. The extraction may involve filtering account data from other data supplied with the mobile terminal data.

The server may not know the particular VAS provider or providers with whom the merchant is cooperating. Moreover, where there are a plurality of VAS providers with whom the server is in communication, each VAS provider may have a different set of account data for identifying and verifying the particular account associated with the mobile terminal. Thus the server identifies a particular account manager or VAS provider from a plurality of account managers based on the mobile terminal data. This may involve identifying particular set of data points (i.e. single data elements such as name, address or payment vehicle type) from the mobile terminal data and identifying a VAS provider for whom all the necessary data points have been supplied to enable the consumer account to be located.

Thus the server determines, based on the mobile terminal data, the particular VAS provider with whom the merchant cooperates and with whom the consumer has an account. It does so by identifying the account data represented in the mobile terminal data and determining one or more account managers for whom a set of account data has been identified by which the respective account manager can identifying a unique consumer account. If the user selects an app on the mobile terminal that results in transmission of the mobile terminal data, the app may determine the particular data points required for the particular VAS provider that are to be supplied in the mobile terminal data.

Once the set of account data have been identified, the set of account data are transmitted from the server to an account manager at step 108. The set of account data uniquely identifying a consumer account managed by the account manager. The consumer account may be an account associated with one or more coupons or discounts to which the consumer is entitled. The consumer account may also be configured to manage accumulation and redemption of rewards or loyalty points resulting from actions (such as transactions) performed by the consumer. In this manner, the consumer account is configured to manage or be associated with transaction modifiers. Each transaction modifier comprises a coupon, discount, loyalty or reward point that can be used to modify transaction credentials. For example, a discount can modify the ticket amount of the transaction, and a coupon can result in another item or some other peripheral benefit being added to the transaction. Similarly, rewards or loyalty points can be used to reduce the ticket amount by an amount relative to the number of rewards or loyalty points the consumer wishes to redeem.

The account manager identifies the relevant consumer account and thus identifies the transaction modifiers associated with the consumer account. The transaction modifiers may include transaction modifiers that can be used at the merchant in question, along with transaction modifiers that cannot be used at the merchant in question. The account manager determines the transaction modifiers that can be used to modify transaction credentials of the transaction (i.e. of the transaction with the merchant in question) and transmits the relevant transaction credentials to the receiving terminal via the server—in other words, one or more transaction modifiers that are associated with the consumer account are received at the receiving terminal per step 110. Where appropriate, the server associates the transaction modifiers with an identifier, such as the unique identifier mentioned with reference to FIG. 1A, by which the receiving terminal can associate the transaction modifiers with a transaction.

The transaction modifiers can then be used to modify one or more of the transaction credentials per step 112. The transaction modifiers may reduce the ticket amount of the transaction, apply a peripheral benefit (such as a two-for-one deal or bonus product) to the transaction, or may result in another modification of the transaction to the benefit of the consumer. In one embodiment, the transaction modifier result in rewards or loyalty points being accumulated for the transaction. The rewards or loyalty points may be proportional to the ticket amount.

Figure 20:
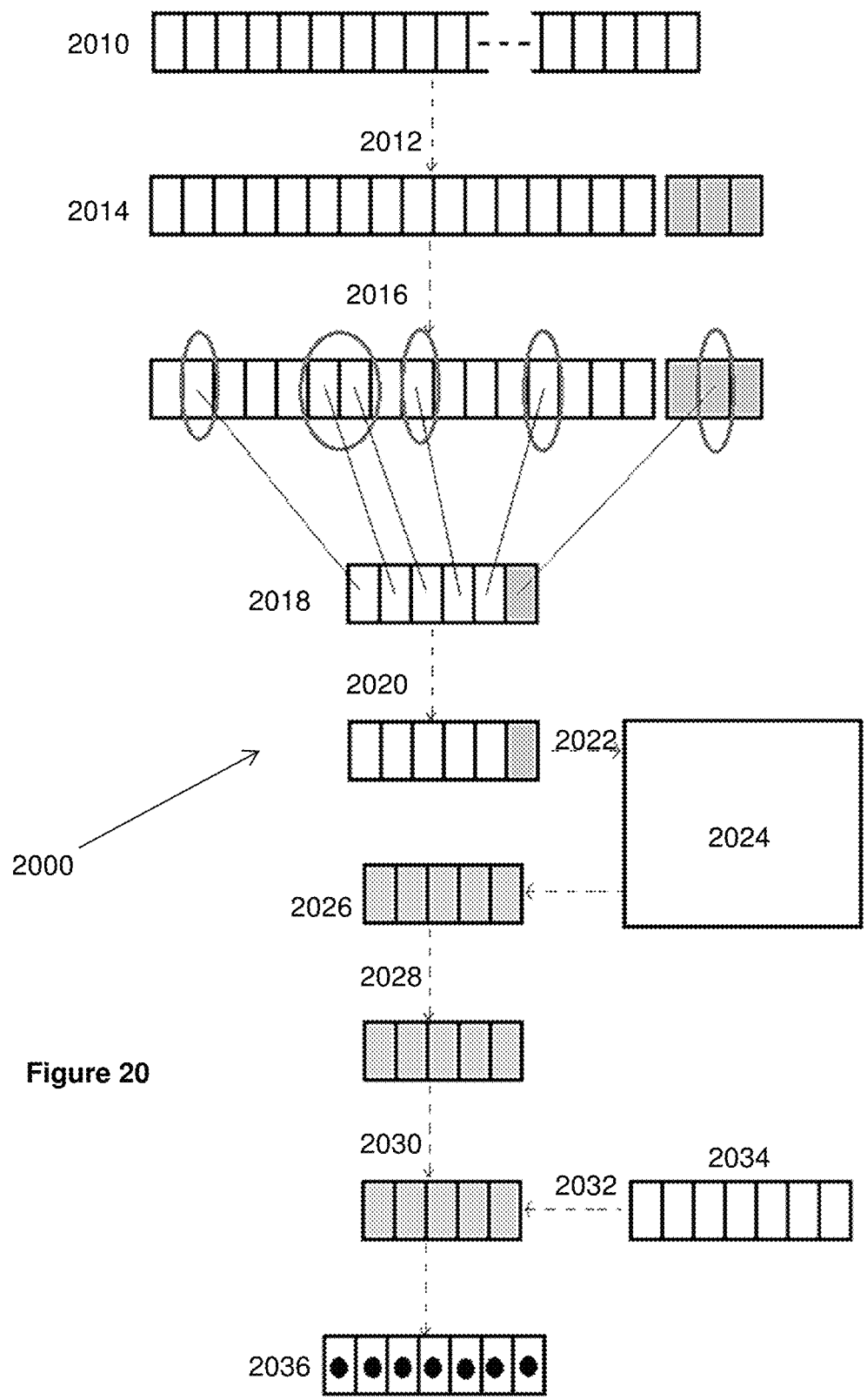
FIG. 20 shows a data flow in accordance with the method of FIG. 1B.

FIG. 20 illustrates the flow 2000 of data in the method of FIG. 1B. In particular:

Step 2010: the mobile terminal generates a set of mobile terminal data and sends (step 2012) the mobile terminal data to receiving terminal, each box in the string of boxes representing a data element such as a name, address or payment vehicle identifier (e.g. credit card number);

Step 2014: the receiving terminal adds additional data to the mobile terminal data, if necessary (e.g. where a bridging application is used as discussed with reference to FIG. 12) and sends (step 2016) the mobile terminal data (which now includes the additional data) to the server;

Step 2018: the server extracts a set of account data from the mobile terminal data and sends (step 2020) the set of account data to the account manager;

Step 2022: the account manager identifies an account 2024 associated with the account data, produces one or more transaction modifiers 2026 associated with the account data, and sends (step 2028) the one or more transaction modifiers to the server, which sends (step 2030) the one or more transaction modifiers to the receiving terminal;

Step 2032: the receiving terminal applies the one or more transaction modifiers to the transaction credentials 2034, thereby producing a set of modified transaction credentials 2036.

Figure 1C:
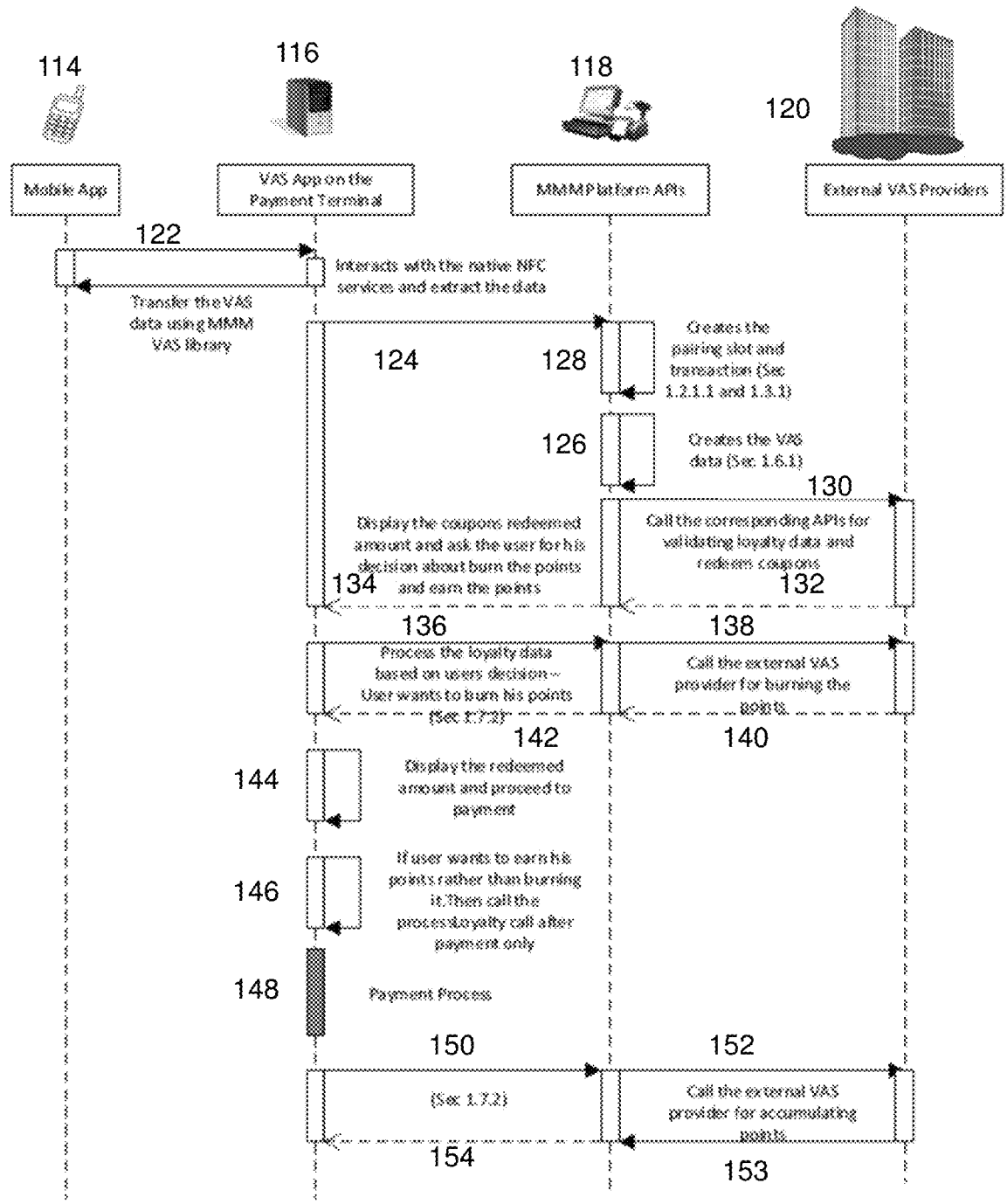
FIG. 1C shows a flowchart of a process for achieving the method of FIG. 1B.

FIG. 1C shows the interaction between a mobile terminal 114, receiving terminal 116, server 118 and external account managers or VAS providers 120, for modifying of one or more transaction credentials. The process flow is typically initiated by a consumer commencing a transaction at an in-store checkout of a merchant. Thus the process flow of FIG. 1C will commence after initiating the transaction per step 102.

In FIG. 1C the mobile terminal 114 transmits mobile terminal data (step 122) from the mobile terminal 114 to the receiving terminal 116. The mobile terminal data comprises value-added service data for identifying one or more transaction modifiers that can be used to modify transaction credentials. The value added service data comprises account data from which the consumer account, managed by an account manager, can be identified. Thus the value added service provides additional value when executing the transaction than would have been available to the consumer had the value added service not been used. For example, where the value added service comprises a discount, the consumer will need to pay lower ticket amount to execute the transaction than would have been payable in the event that no discount was applied.

The mobile terminal data may be transmitted using the native NFC services or QR-code scanning services of the receiving terminal 116. Thus no additional overhead is required to process the mobile terminal data to facilitate use of VAS, nor is there increased complexity on the receiving terminal.

The receiving terminal 116 sends a message to the server 118 comprising the mobile terminal data from which the set of account data can be extracted (step 124). The mobile terminal data may be forwarded as received by the receiving terminal 116—in other words, with modification or processing at the receiving terminal 116. The receiving terminal 116 may alternatively forward the mobile terminal data in data form. For example, the receiving terminal 116 may forward the mobile terminal data after having configured that data for analysis (e.g. extracting of account data) by the server 118.

The server 118 then extracts the set of account data from the mobile terminal data (step 126). The set of account data may include a single data point, such as an IMEI. For example, where a single data point can be used to identify and validate a consumer account, that single data point may be identified by the server 118. Thus the set of account data will comprise a single data point. Alternatively, the server 118 may extract a plurality of data points comprising the set of account data. The plurality of data points may also comprise additional data that is discarded once the server 118 identifies the relevant account manager for providing value added services to a transaction.

An optional step 128 may be performed, to allocate a memory slot for storing transaction data. The memory slot may be created before, during or after the set of account data is extracted.

Once the set of account data has been identified, the server 118 sends the set of account data to an account manager 120. The account manager 120 is identified as the correct account manager (i.e. from a plurality of potential account managers) by the set of data extracted from the mobile terminal data. If the set of mobile terminal data comprises a particular set of data points then that particular set of data points will indicate involvement of a unique account manager for the generation of transaction modifiers. If the set of mobile terminal data comprises a different particular set of data points then that different particular set of data points will indicate involvement of a different, unique account manager for the generation of transaction modifiers.

At step 130 the account manager 120 receives the set of account data. The account manager matches the set of account data with account data for identifying a particular consumer account. The account manager then determines transaction modifiers to which the consumer is entitled (e.g. discounts, coupons and loyalty points). The transaction modifiers comprise discounts, loyalty points and coupons associated with the account. Once identified, the transaction modifiers are sent to the server 118 at step 132 and from the server 118 to the receiving terminal 116 at step 134.

The receiving terminal 116 then displays the available transaction modifiers for selection by the consumer. The transaction modifiers may be displayed on a touchscreen at the receiving terminal 116 such that selection of a particular transaction modifier is made by tapping on the touchscreen. In an alternative embodiment, the one or more transaction modifiers may be automatically applied by the receiving terminal 116 to the transaction credentials. Once received at the receiving terminal 116 and displayed to the consumer, the consumer can then select whether to use or redeem various transaction modifiers, or whether to retain those transaction modifiers for future use. Where the consumer elects not to use a particular transaction modifier, the receiving terminal 116 advises the account manager 120, via the server 118, that the transaction modifier or modifiers were not used. The account manager 120 can therefore ensure the relevant transaction modifiers remain available for use in future transactions. Where the consumer elects to use a particular transaction modifier, the receiving terminal 116 advises the account manager 120, via the server 118, that the transaction modifier has been used. The account manager 120 therefore makes the particular transaction modifiers unavailable for future use. In some cases the account manager 120 will automatically make all relevant transaction modifiers unavailable for future use until advise by the receiving terminal 116 that a particular transaction modifier was not used in the transaction. The consumer account may also be associated with one or more inexhaustible transaction modifiers (e.g. discounts relating to memberships that apply to all transactions at a particular merchant) that are not made unavailable for future use regardless of the number of uses of the inexhaustible transaction modifier in previous transactions.

If the consumer elects to use a VAS modifier, the decision of the consumer is transmitted from the receiving terminal 116 to the server 118 (step 136) and from the server 118 to the account manager 120 (step 138). The account manager 120 then updates the consumer account to reflect the consumer's decision. Once updated, the account manager 120 advises the server 118 (step 140) that the consumer account has been updated, the server 118 advises the receiving terminal 116 (at step 142) that the consumer account has been updated, and the receiving terminal 116 displays the transaction credentials modified according to the VAS modifier or modifiers.

After selection of one or more VAS modifiers to use in the transaction, the receiving terminal 116 displays updated transaction credentials (step 144). The updated transaction credentials are modified, when compared with the transaction credentials prior to the update, according to the one or more transaction modifiers that the consumer elected to use.

If the consumer elects not to use any VAS modifiers, then the receiving terminal 116 stores a flag (step 146) to advise the VAS provider that Vas modifiers were not used in the transaction.

The transaction is then executed at the receiving terminal 116 per step 148. The transaction may be made using a credit or debit card, bank transfer, cash or cash equivalent or any other payment means.

Once executed, the transaction credentials are final. In other words, the transaction credentials are not subject to change. Thus the receiving terminal 116 knows whether any VAS modifiers have been used to modify transaction credentials. If no VAS modifiers have been used then the receiving terminal 116 advises the server 118 (step 150), that in turn advises the account manager 120 (step 152), that the consumer has elected not to use any VAS modifiers in the transaction. In this circumstance the receiving terminal 116 may determine a number of loyalty or rewards points associated with the transaction. The number of loyalty or rewards points is then sent to the server 118 (step 153) and from the server 118 to the receiving terminal (step 154).

For completeness, after updating the consumer account at the VAS provider (e.g. with new loyalty or rewards points or coupons) the account manager 120 advises the payment terminal 116, via the server 118, and the VAS have been completed.

Figure 1D:
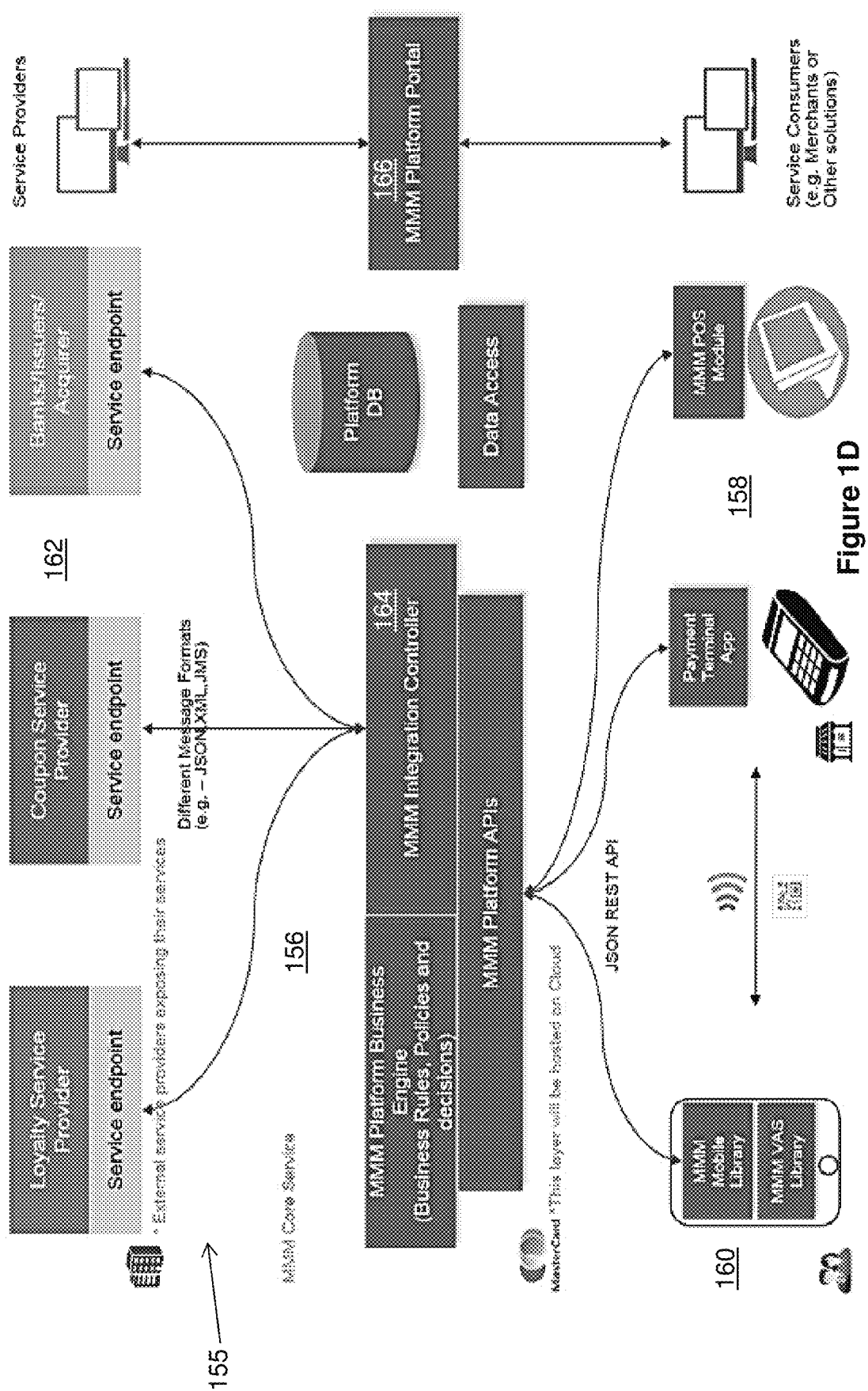
FIG. 1D shows an architectural schematic of a system that uses the server described with reference to FIG. 1B.

FIG. 1D is a system architecture diagram of a system 155 for performing the method of FIG. 1B. The architecture governs interaction between a server 156, end users including the receiving terminal (i.e. a merchant) 158 and mobile terminal (i.e. consumer) 160, and VAS providers 162. The VAS providers 162 may include any third party whose services involve the provision and management of VAS modifiers. A VAS provider may thus be a loyalty service provider, coupon service provider, bank, issuer, acquirer or any other party that can provide VAS modifiers for use in the transaction.

The server 156 is similar to the server 212 of FIGS. 2 to 10, with the exception that server 156 includes an additional integration controller 164. The integration controller 164 allows the server 156 to serve as an intermediary between the receiving terminal 158 and VAS providers 162. Integration controller 164 is not shown in FIGS. 2 to 10 but may constitute a feature of the server 212 of those Figures.

To use the services of the integration controller 164 a consumer or merchant may register with the server 156 through the platform portal 166. Alternatively, use may be automatic where the merchant is already registered for using another service provided by the server 156.

The integration controller 164 manages transmission of information between the receiving terminal 158 and the VAS providers 162. The integration controller 164 removes the need for the receiving terminal 158 to provide complex processing for receiving information and identifying account details from that information for enabling involvement of VAS providers' services in the transaction. Instead, the receiving terminal 158 receives mobile terminal data comprising a set of account data. That mobile terminal data is transmitted from the receiving terminal 158 to the server 156. More particularly, the integration controller 164 receives the mobile terminal data from the receiving terminal 158.

The integration controller 164 extracts the set of account data, used by the account manager, from the mobile terminal data supplied by the receiving terminal 158. The mobile terminal data may include header data for each data point, the header data identifying particular data points—in other words, where the data point is the name of the consumer, the postal address of the consumer or the IMEI of the mobile terminal 160 the header data may identify the data point as such so that the integration controller 164 knows what the data represents. Since VAS providers require different data points in order to identify, and authorise access to, a consumer account the integration controller 164 determines which data points have been received and thus which VAS providers' requirements have been met. In other words, the integration controller 164 identifies, based on the mobile terminal data, the VAS provider the services of whom are to be used in the transaction.

The integration controller 164 may alternatively analyse the mobile terminal data to determine the nature of each data point. For example, the integration controller 164 may identify whether a particular data point in the mobile terminal data comprises a username or IMEI.

In some instances the consumer will be a member of a particular program managed by the VAS provider. For example, the consumer may be registered to accumulate rewards points in a particular rewards program. In other instances the VAS provider may be automatically made available to the consumer. For example, where the consumer uses a digital wallet or credit card for a particular transaction, the issuer bank of the credit card or the supplier of the digital wallet may provide VAS modifiers at particular merchants or on first use of the credit card or digital wallet.

Once the integration controller 164 has identified the particular data points and their nature, the integration controller 164 can extract a set of account data comprising one or more of the data points. The set of account data is the set of data points required by a particular VAS provider in order for the VAS provider to identify, and authorise access to, a consumer account managed by the VAS provider. Since VAS providers use different data points to manage identification and use of the consumer accounts managed by the respective VAS provider, the set of account data may comply with the requirements of only one VAS provider.

The set of account data are then sent from the integration controller 164 to the VAS provider whose identification and access requirements are met by the set of account data. The VAS provider determines which VAS modifiers (e.g. discounts, coupons or loyalty points) are applicable to the transaction based on the VAS modifiers associated with the consumer account. The VAS modifiers associated with the consumer account are those VAS modifiers to which the consumer is entitled.

The VAS provider 162 returns the VAS modifiers to the server 156 and the server 156 sends the VAS modifiers to the receiving terminal 158. The VAS modifiers may be returned from the VAS provider 162 to the integration controller 164, or to another part of the server 156, for forwarding to the receiving terminal 158. Where a unique identifier is used to establish a communication link between the mobile terminal 160, receiving terminal 158 and server 156 per FIG. 1A, the server 156 may apply the unique identifier to the VAS modifiers to enable the receiving terminal 158 to match the VAS modifiers to the transaction.

Once the VAS modifiers are received at the receiving terminal 158, the receiving terminal 158 may automatically apply the VAS modifiers. Alternatively, the receiving terminal 158 may request confirmation from the consumer that they wish to redeem a particular VAS modifier or modifiers in the transaction in question.

Figure 1E:
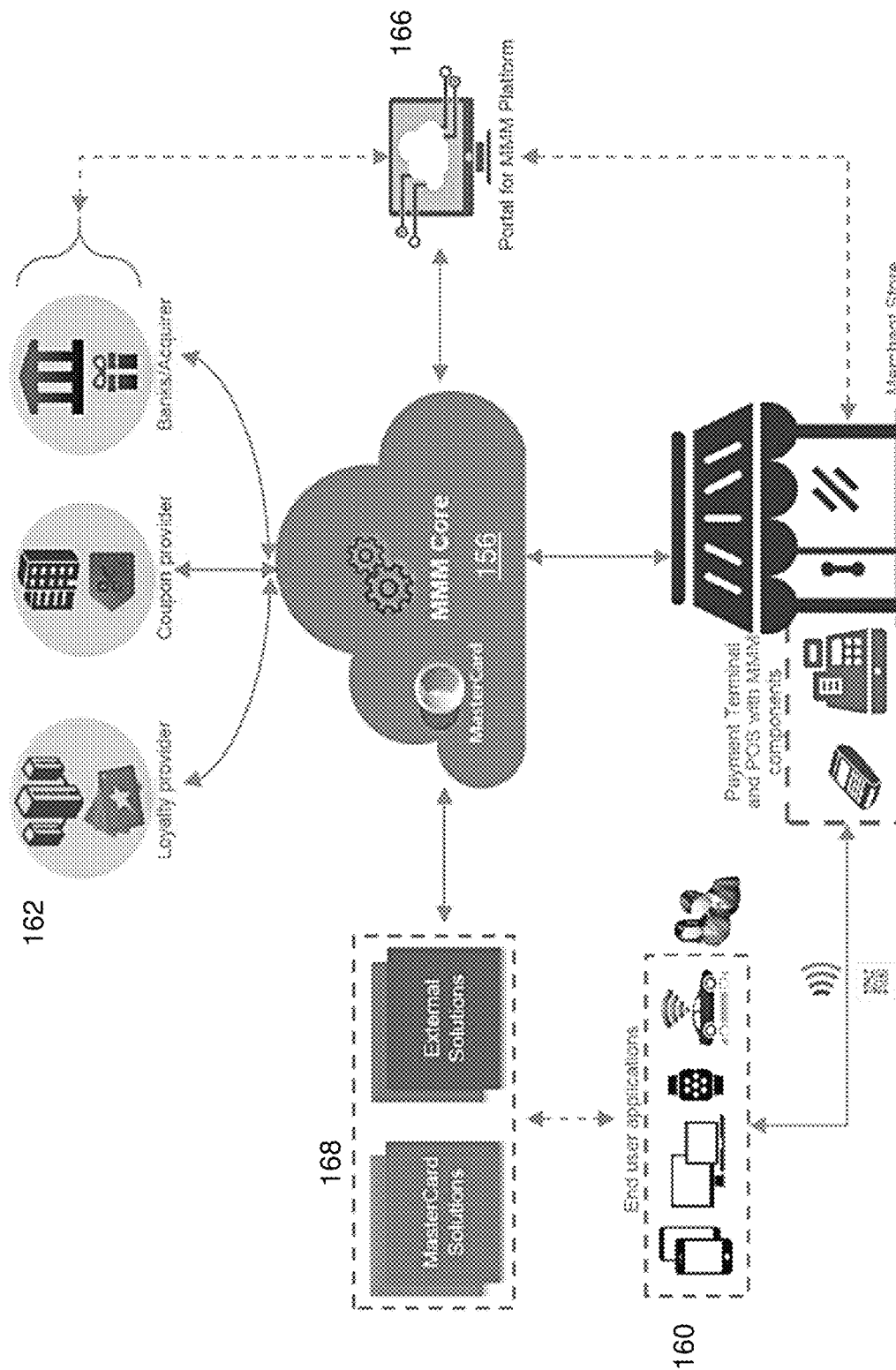
FIG. 1E shows an architectural schematic of a system that uses the server described with reference to FIG. 1B.

FIG. 1E shows a similar architecture to that provided by FIG. 1D. In addition to the architecture components of FIGS. 1D, 1E involves using external solutions providers 168 to enhance the service offering of the server 156. The external solutions providers 168 may include credit card schemes, app providers and others. The external solutions providers can supply additional information to the server 156 to facilitate smoother conduct of transactions. For example, the external solutions providers may provide a digital wallet app that enables use of credit cards during a transaction and also the provision of credit card information to supplement the data points extracted from the mobile terminal data. External service providers may also include app stores from which the merchant app or VAS provider app can be downloaded.

Figure 1F:
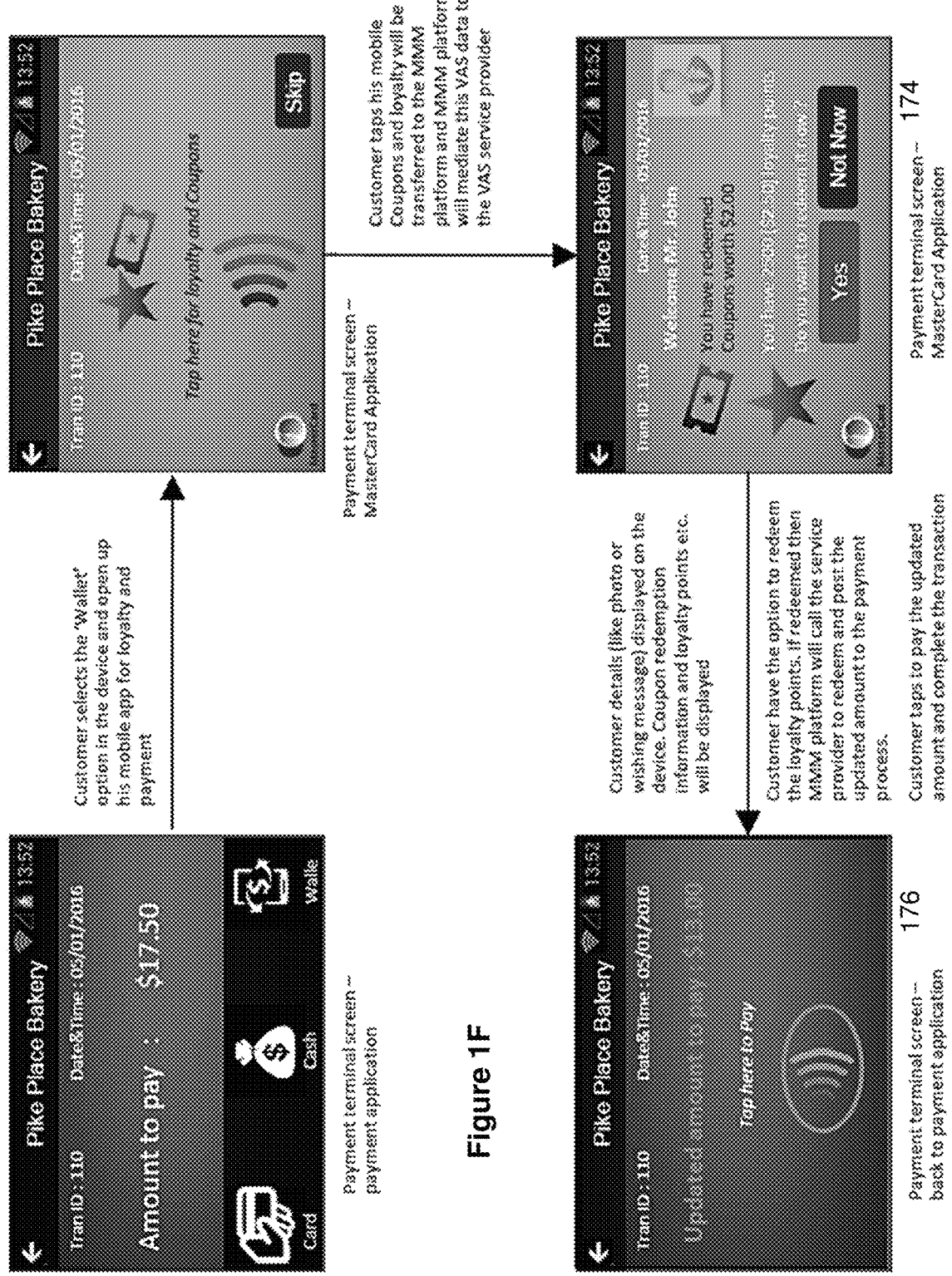
FIG. 1F provides a sequence of screenshots of a payment terminal used in performing the method of FIG. 1B.

FIG. 1F provides an illustrative sequence of screenshots taken from a payment terminal of a receiving terminal. A step 170 a transaction is initiated and the ticket amount is displayed. The merchant or consumer then selects which method of payment will be used. This selection step, among others, may be optional.

After initiating the transaction the consumer opens an app on the mobile terminal by which to effect payment and/or by which to identify VAS modifiers for use in the transaction. Also, after initiating the transaction the screen of the payment terminal displays options (step 172) for using VAS modifiers and NFC to transmit payment and VAS information from the mobile terminal to the receiving terminal. To use VAS services the user taps their mobile terminal against the receiving terminal. In so doing, mobile terminal data is sent from the mobile terminal to the receiving terminal.

The mobile terminal data is then sent to the integration controller that determines which set of account details and which VAS provider should be used in the transaction. The set of account data are sent to the VAS provider that determines one or more transaction modifiers to apply to the transaction, and the one more transaction modifiers are sent, via the server, to the receiving terminal. At step 174, the VAS modifiers or their effect is displayed—e.g. for a 20% discount VAS modifier the screen may display a 20% discount coupon or may alternatively display the ticket amount discounted by 20%.

The display also shows options for accepting or decline use of the VAS modifiers. After deciding whether to accept or decline use of the VAS modifiers the screen shows the final transaction credentials at step 176, such as the updated ticket amount, and the consumer pays. In the present embodiment the consumer taps to pay using their digital wallet and NFC communication.

The receiving terminal thus presents VAS information to the consumer to enable a decision to be made as to whether to use a particular value-added service. In addition, the payment terminal, in conjunction with the server, provides access to VAS provider services with additional infrastructure costs since the operation is managed through the payment terminal.

Figure 2:
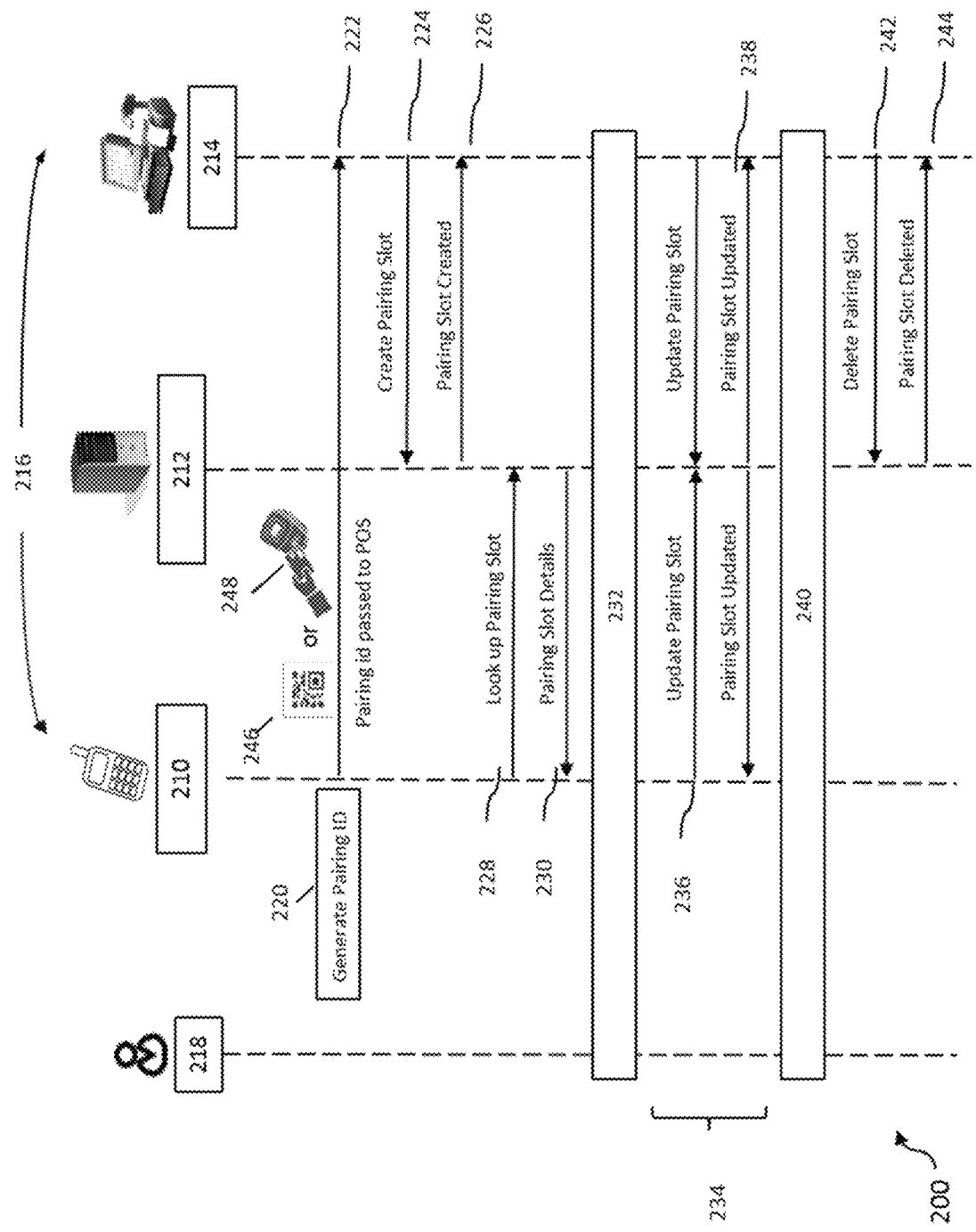
FIG. 2 shows a first implementation of the method of FIG. 1A.

FIG. 2 shows the method of FIG. 1A being implemented using a process flow 200. The process flow 200 is performed by a mobile terminal 210 (operated by a user 218), a receiving terminal 214 and a server 212 that administers a communication link 216 over which transaction data is transmitted between the mobile terminal 210 and the receiving terminal 214.

A unique identifier, used to facilitate the enablement of the communication link 216, is stored in a memory of the mobile terminal 210, the receiving terminal 214 and the server 212 as follows. The mobile terminal 210 stores the unique identifier after the mobile terminal generates 220 the unique identifier. The receiving terminal 214 receives 222 the unique identifier generated by the mobile terminal 210 and stores the generated unique identifier.

The unique identifier may be generated, within the mobile terminal 210, using an application installed in the mobile terminal 210. The unique identifier may be computationally generated by the mobile terminal or may be identified with reference to a unique identifier of the mobile terminal itself, such as the IMEI of a smartphone.

The application may be initiated by use of the mobile terminal 210 to initiate purchase of goods and/or services. In this process, the transaction data, transmitted between the mobile terminal 210 and the receiving terminal 214 through the communication link 216, results from processing the payment of the goods and/or services. The unique identifier may be transmitted 222 from the mobile terminal 210 to the receiving terminal 214 using a NFC protocol 248 or through a OR (Quick Response) code 246 displayed on the mobile terminal 210 and scanned by the receiving terminal 214, wherein the unique identifier is extracted from the OR code 246 scanned into the receiving terminal 214.

A storage slot is then created at the server 212 administering the communication link 216. In the implementation shown in FIG. 2, the storage slot is created by the receiving terminal 214 making an API (application interface) call 224 to the server 212 using the unique identifier. Thus, the storage slot is created in response to being prompted by the receiving terminal 214 after the receiving terminal 214 receives the unique identifier. The storage slot is assigned the unique identifier, for example, by storing the unique identifier. The storage slot is also used to store the transaction data. The server 212 then returns 226 a message to the receiving terminal 214 that the storage slot has been created. This notifies the receiving terminal 214 that data generated and transmitted during communication with the mobile terminal 210 can be stored.

The communication link 216 is enabled in response to the creation of the storage slot. The mobile terminal 210 calls 228 the server 212 to look up the storage slot with the unique identifier. The server 212 then returns 230 a message to the mobile terminal 210 that the storage slot has been created and provides details of the storage slot. The communication link 216 can then be utilised by both the mobile terminal 210 and the receiving terminal 214 by referencing the unique identifier to the server 212. This establishes a communications path 232 over which a transaction 234 can take place, wherein the purchase of the goods and/or services, initiated by the mobile terminal 210, is processed during the transaction 234.

During the transaction 234, each of the mobile terminal 210 and the receiving terminal 214 will send messages to update 236 the storage slot (i.e. store data in, or modify data already stored in, the slot) in the server 212 with using the transaction data exchanged between the two terminals 210 and 214. The server 212 will reply by returning 238 a message to the mobile terminal 210 and the receiving terminal 214 that its storage slot has been updated.

When the transaction is completed 240, the receiving terminal 214 transmits 242 a request for the storage slot to be deleted. In one implementation, the deletion of the storage slot may occur only after a receipt of the transaction 234 is retrieved from the storage slot in the server 212, which is described in greater detail in FIG. 5. In another embodiment, the storage slot is retained for future calls for the transaction data, such as during data trending analysis or when reviewing past transactions. In a further embodiment, a subset of the transaction data is retained, or relocated in memory, to enable future user of that subset of data. In embodiments where the storage slot is deleted, the server 212 will return 244 a message to the receiving terminal 214 indicating that the storage slot has been deleted.

The process flow 200 has the mobile terminal 210, the receiving terminal 214 and the server 212 receive and store the unique identifier, followed by the creation of the storage slot, i.e. the process flow 200 implements the method 101 of FIG. 1A by having the creation of the storage slot occur after the mobile terminal 210, the receiving terminal 214 and the server 212 receive the unique identifier. However, storage slot creation may occur before the sharing of the unique identifier with the mobile terminal 210, the receiving terminal 214 and the server 212, as described below with respect to FIG. 3.

Figure 3:
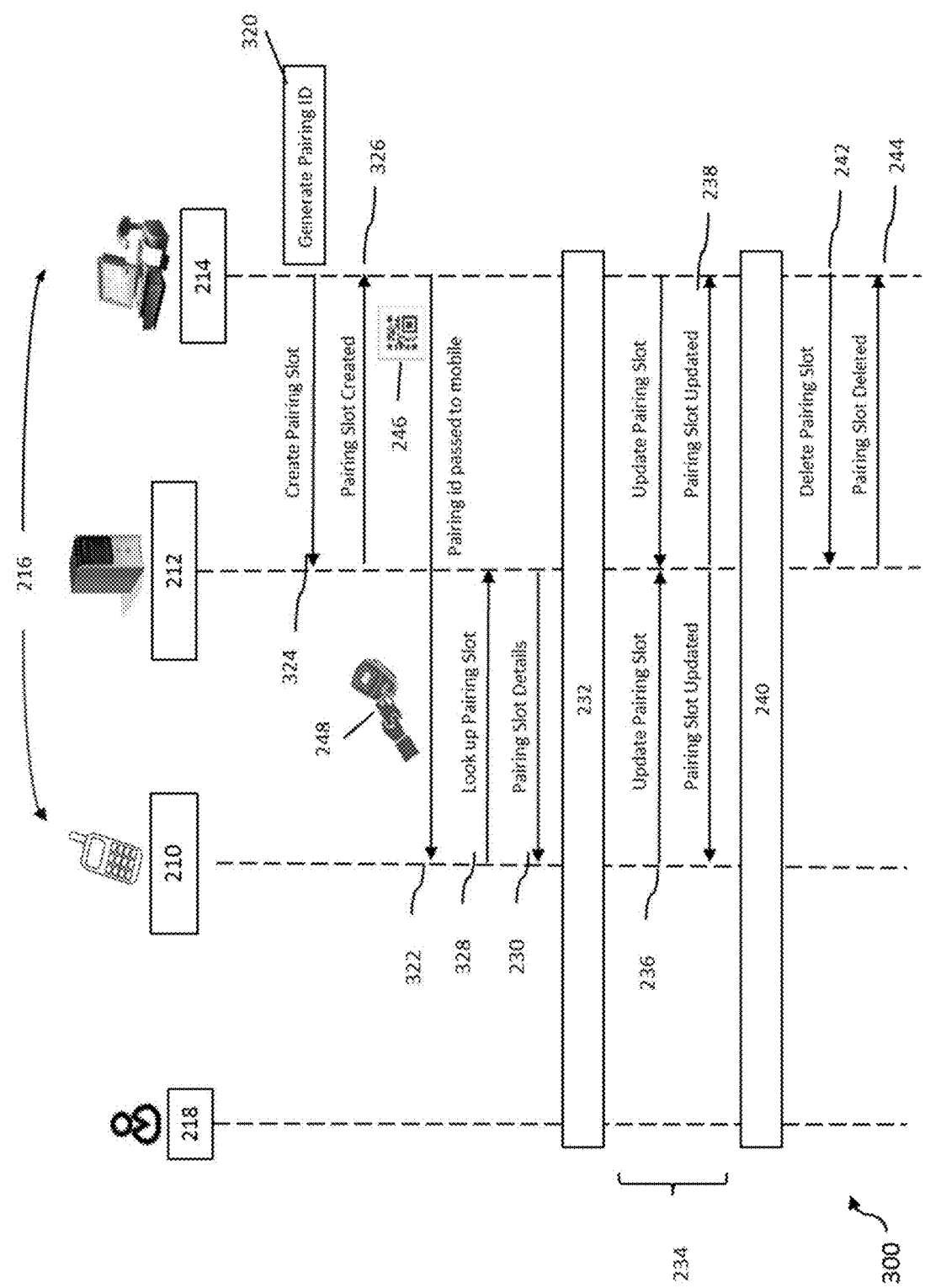
FIG. 3 shows a second implementation of the method of FIG. 1A.

FIG. 3 shows the method of FIG. 1A being implemented using a process flow 300. As in FIG. 2, the process flow 300 is performed using a mobile terminal 210 (operated by a user 218), a receiving terminal 214 and a server 212 that administers a communication link 216 over which transaction data is transmitted between the mobile terminal 210 and the receiving terminal 214. The differences between the process flow 200 of FIG. 2 and the process flow 300 of FIG. 3 are described below.

One difference between the process flow 300 of FIG. 3 and the process flow 200 of FIG. 2 is that the receiving terminal 214 generates 320 the unique identifier in FIG. 3, whereas the unique identifier is generated 220 by the mobile terminal 210 in FIG. 2. The receiving terminal 214 stores the unique identifier after the receiving terminal 214 generates 320 the unique identifier.

The memory is then allocated, or the storage slot is then created, using this generated unique identifier, by the receiving terminal 214 making an API call 324 to the server 212. The server 212 generates the storage slot, stores the generated unique identifier into memory (e.g. in the storage slot) and the storage slot is assigned the unique identifier. Therefore, similar to FIGS. 2, in 3 the receiving terminal 214 has the unique identifier before the storage slot is created at the server 212. In addition, similar to FIG. 2, the storage slot in FIG. 3 is used to store the transaction data and the unique identifier. The receiving terminal 214 receives 322 the unique identifier generated by the mobile terminal 210 and stores the generated unique identifier. The server 212 then returns 326 a message to the receiving terminal 214 that the storage slot has been created.

Another difference between the process flow 300 of FIG. 3 and the process flow 200 of FIG. 2 is that the mobile terminal 210 receives 322 the unique identifier from the receiving terminal 214. In the process flow 200, the mobile terminal 210 transmits 222 the unique identifier to the receiving terminal 214. In addition, in FIG. 3, the mobile terminal 210 receives the unique identifier after the storage slot is created at the server 212. In contrast, FIG. 2 has the mobile terminal 210 receiving the unique identifier before the storage slot is created at the server 212.

The unique identifier may be transmitted 322 from the receiving terminal 214 to the mobile terminal 210 using a NFC protocol 248 or through a OR code 246 displayed on a display screen of the receiving terminal 214 and scanned by the mobile terminal 210, wherein the unique identifier is extracted from the OR code 246 scanned into the mobile terminal 210. Thus while FIG. 2 uses a forward OR approach to have both the receiving terminal 214 and the mobile terminal 210 receive the unique identifier, FIG. 3 uses a reverse OR approach. In this reverse OR approach, the creation of the storage slot occurs before the mobile terminal 210, the receiving terminal 214 and the server 212 receive and store the unique identifier, wherein the unique identifier is transmitted 322 from the receiving terminal 214 to the mobile terminal 210 using the OR code 246.

After the mobile terminal 210 receives 322 the unique identifier generated by the receiving terminal 214, the mobile terminal 210 calls 328 the server 212, using the received unique identifier, to look up the storage slot. FIG. 3 thus describes an approach where the unique identifier is generated by the receiving terminal 214, while the mobile terminal 210 and the server 212 both receive the unique identifier by the receiving terminal 214 transmitting the generated unique identifier to them.

Figure 4:
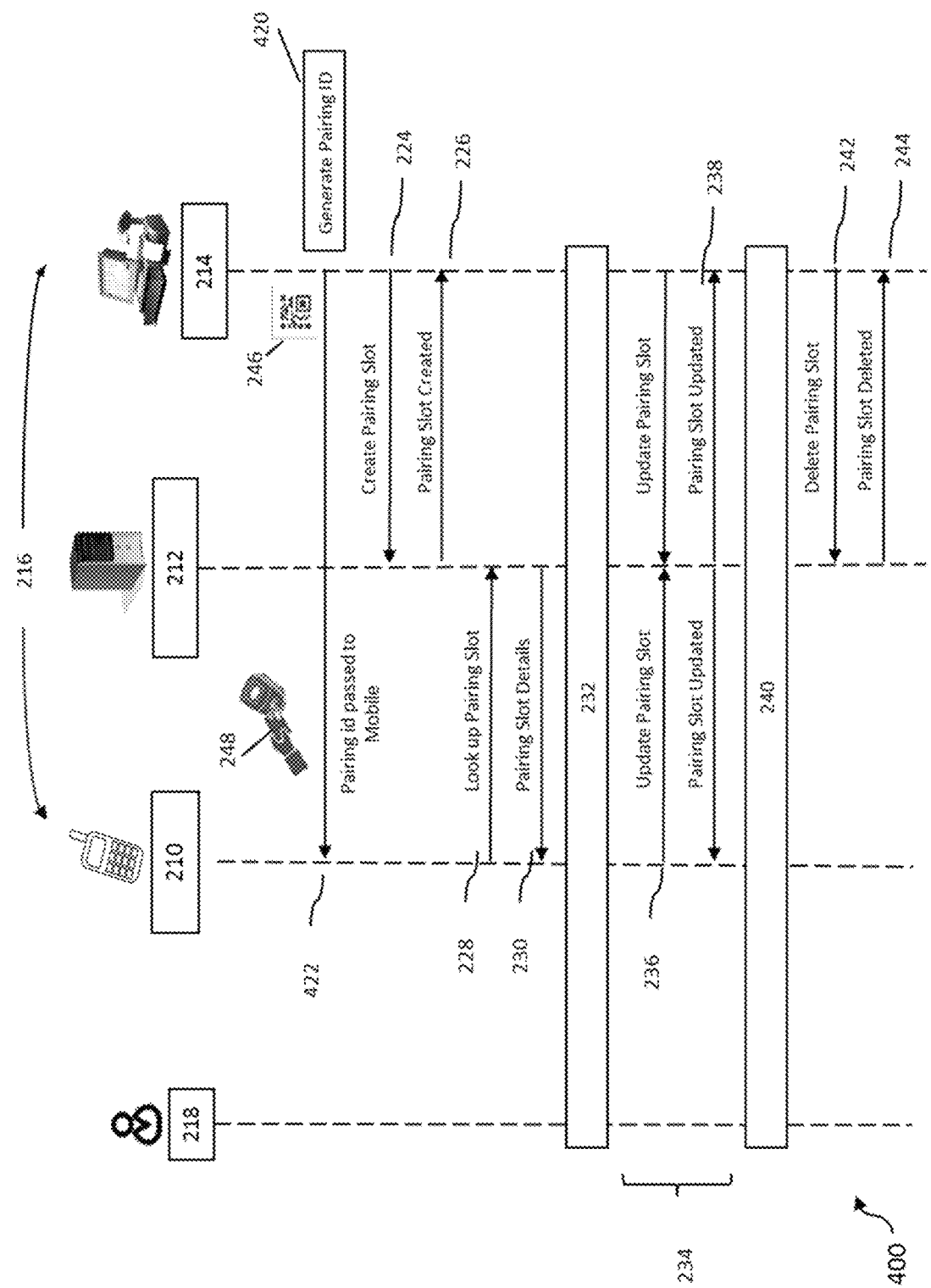
FIG. 4 shows a third implementation of the method of FIG. 1A.

FIG. 4 shows the method of FIG. 1A being implemented using a process flow 400. As in FIGS. 2 and 3, the process flow 400 is performed using a mobile terminal 210 (operated by a user 218), a receiving terminal 214 and a server 212 that administers a communication link 216 over which transaction data is transmitted between the mobile terminal 210 and the receiving terminal 214. The main difference between the process flow 400 of FIG. 4 and the process flow 200 of FIG. 2 is described below.

In the process flow 400, the receiving terminal 214 stores the unique identifier after the receiving terminal 214 generates 420 the unique identifier. The mobile terminal 210 then receives 422 the unique identifier generated by the receiving terminal 214 and stores the generated unique identifier. Both the receiving terminal 214 and mobile terminal 210 thus have a common unique identifier for use to recognise communications, relevant to a particular transaction, sent once the communication link is established.

The unique identifier may be transmitted 422 from the receiving terminal 214 to the mobile terminal 210 using a NFC protocol 248. The unique identifier may instead be transmitted 422 from the receiving terminal 214 to the mobile terminal 210 through a OR code 246 displayed on a display screen of the receiving terminal 214 and scanned by the mobile terminal 210, wherein the unique identifier is extracted from the OR code 246 scanned into the mobile terminal 210. Thus while FIG. 2 uses a forward OR approach to have both the receiving terminal 214 and the mobile terminal 210 receive the unique identifier, FIG. 4 uses a reverse OR approach. In this reverse OR approach, the creation of the storage slot occurs after both the mobile terminal 210 and the receiving terminal 214 receive the unique identifier, wherein the unique identifier is transmitted 422 from the receiving terminal 214 to the mobile terminal 210 using the OR code 246.

As described with reference to FIGS. 2 to 4, the unique identifier is transmitted between the receiving terminal 214 and the mobile terminal 210 using a NFC protocol or a OR code. When the OR code is used, the receiving terminal 214 or the mobile terminal 210 may receive an indication of the utilisation of the communication link 216 to facilitate payment of goods and/or services upon which the transaction data is based, wherein the indication is provided in the OR code. With reference to FIG. 2, the receiving terminal 214 may receive the indication from the OR code transmitted by the mobile terminal 214. With reference to FIGS. 3 and 4, the mobile terminal 210 may receive the indication from the OR code transmitted by the receiving terminal 214.

The NFC approach described in FIGS. 2 to 4 enables direct bidirectional communication between the mobile terminal 210 and the receiving terminal 214. As such, in the NFC implementation, the communication link 216 is not used to exchange data that facilitates payment of goods and/or services. The storage slot is then used to store transaction data such as data generated during a transaction for purchase of goods and/or services. The transaction data thus generated may comprise any one or more of payment details of the transaction—e.g. a ticket amount, a date of transaction and/or a time of transaction; a receipt of the transaction and details of the purchased goods and/or services; and data used to facilitate redemption of value added services or indicative of the modification to the transaction data resulting from use or redemption of value added services (e.g. use of a coupon or loyalty points).

In FIGS. 2 to 4, it is preferable for storage slot creation in the server 212 to occur in response to prompting by the receiving terminal 214. In addition, the generation of the unique identifier required to create the storage slot is in response to the mobile terminal 210 providing an indication of requiring the enablement of the communication link 216. It will be appreciated that the different implementations described in FIGS. 2 to 4, have the commonality of having the mobile terminal 210 and the receiving terminal 214 receive a unique identifier used to facilitate the enablement of the communication link 216; the creation of a storage slot at the server 212 administering the communication link 216, the storage slot being created using the unique identifier and the storage slot used to store the transaction data and the unique identifier; and the enablement of the communication link 216 in response to the creation of the storage slot, wherein the communication link 216 is utilised by both the mobile terminal 210 and the receiving terminal 214 by referencing the unique identifier to the server 212.

Figure 5:
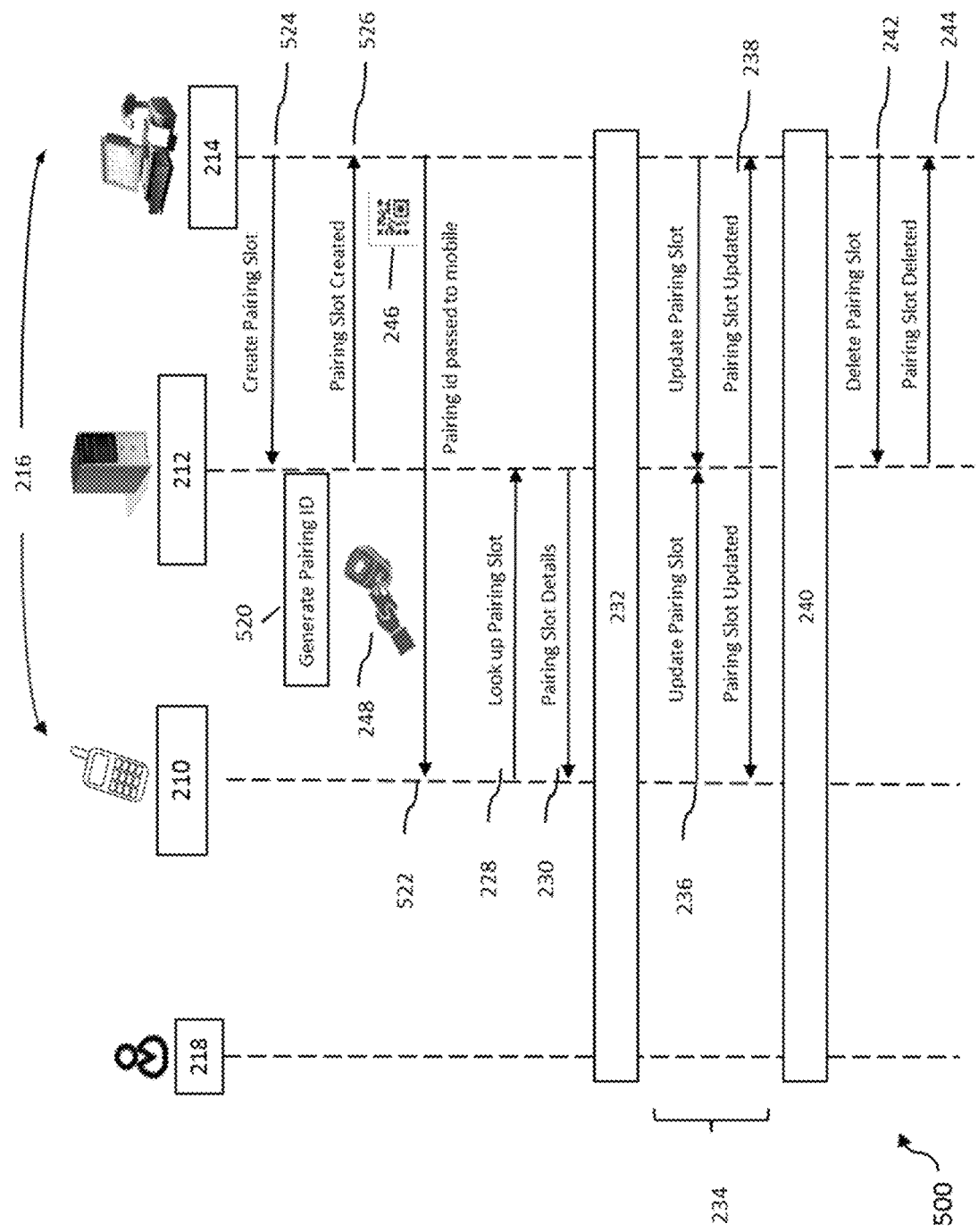
FIG. 5 shows a fourth implementation of the method of FIG. 1A.

FIG. 5 shows the method of FIG. 1A being implemented using a process flow 500. As in FIG. 2, the process flow 500 is performed using a mobile terminal 210 (operated by a user 218), a receiving terminal 214 and a server 212 that administers a communication link 216 over which transaction data is transmitted between the mobile terminal 210 and the receiving terminal 214. The differences between the process flow 200 of FIG. 2 and the process flow 500 of FIG. 5 are described below.

One difference between the process flow 500 of FIG. 5 and the process flow 200 of FIG. 2 is that the server 212 generates 520 the unique identifier, whereas the mobile terminal 210 generates the unique identifier in FIG. 2. The unique identifier is generated 520 from the receiving terminal 214 making an API call 524 to the server 212 to create the storage slot. The server 212 then returns 526 a message to the receiving terminal 214 that the storage slot has been created, along with the unique identifier that has been generated and assigned to the storage slot. The creation of the storage slot before the generation of the unique identifier in FIG. 5 is thus another difference between the process flow 500 of FIG. 5 and the process flow 200 of FIG. 2 because in FIG. 5, the storage slot is created before the mobile terminal 210, the receiving terminal 214 and the server 212 receive and store the unique identifier. It will be understood that a similar process may be applied wherein the server 212 generates the unique identifier, subsequently creates the storage slot and then assigns the unique identifier to the storage slot before transmitting the unique identifier to the receiving terminal 214 and the mobile terminal 210.

The unique identifier may be transmitted 522 from the receiving terminal 214 to the mobile terminal 210 using a NFC protocol 248 or through a OR code 246 displayed on a display screen of the receiving terminal 214 and scanned by the mobile terminal 210, wherein the unique identifier is extracted from the OR code 246 scanned into the mobile terminal 210. Thus while FIG. 2 uses a forward OR approach to have both the receiving terminal 214 and the mobile terminal 210 receive the unique identifier, FIG. 5 uses a reverse OR approach.

Figure 6:
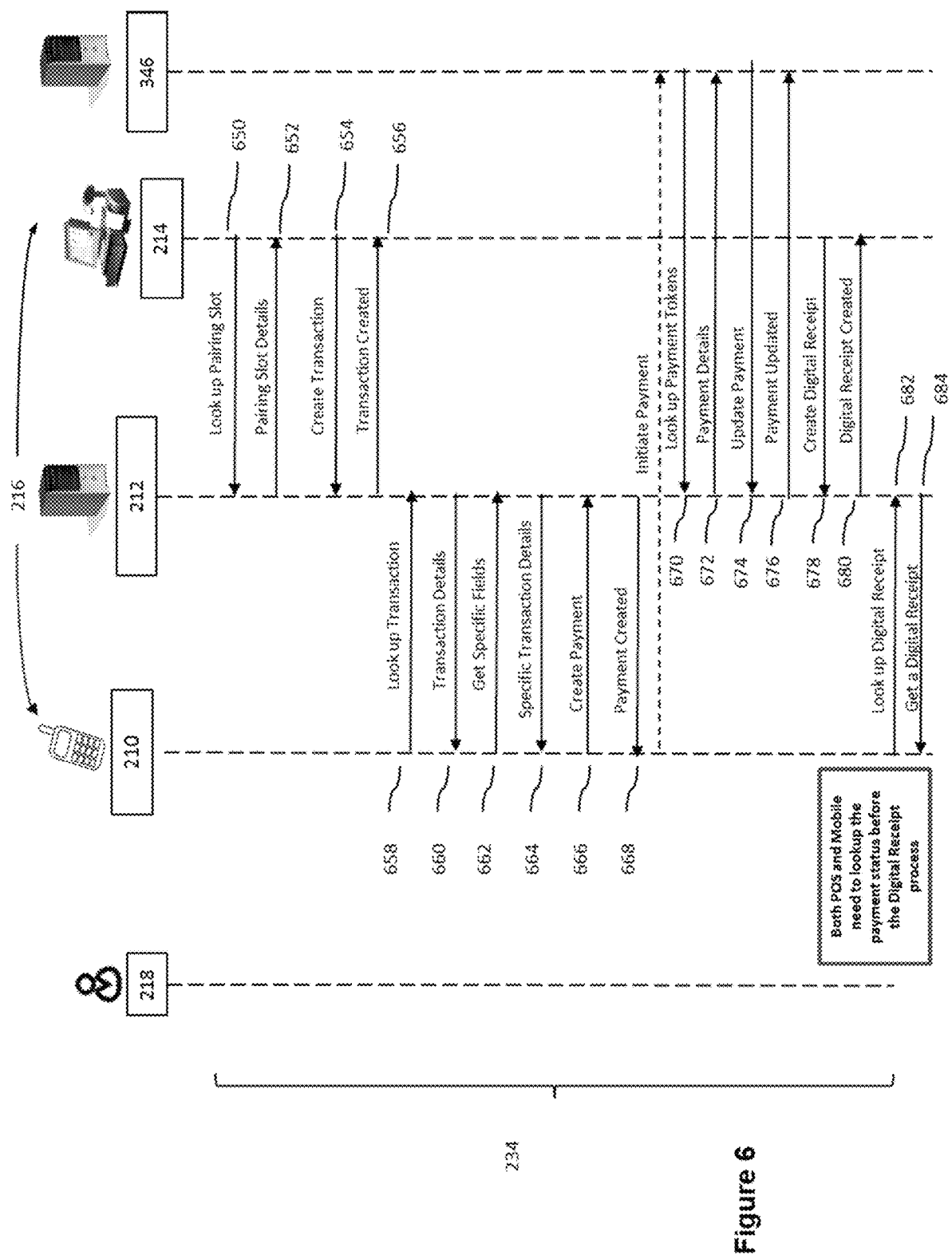
FIG. 6 shows API calls that can be made to complete a transaction after a communication link is established between a mobile terminal and a receiving terminal as per the method described in FIG. 1A.

FIG. 6 shows a process flow 600 which provides an example of API calls that can be made between the mobile terminal 210 and the receiving terminal 214 during the processing of the transaction 234 described in the process flows of FIGS. 2 to 5, i.e. the process flow 600 of FIG. 6 occurs after the pairing described in FIGS. 2 to 5 has been completed. The process flow 600 is performed by the same components as in FIGS. 2 to 5, i.e. a mobile terminal 210 (operated by a user 218), a receiving terminal 214 and a server 212 that administers a communication link 216 over which transaction data is transmitted between the mobile terminal 210 and the receiving terminal 214. In addition, there is a payment interface server 346 which is in data communication with the server 212. The payment interface server 346 acts as an interface or intermediary between the server 212 and external service providers such as external payment processors (e.g. an acquirer bank or an issuer bank).

Core services in the server 212 will respond to API transaction commands from both the mobile terminal 210 and the receiving terminal 214 to hold and update data on the transaction taking place. Process flows of specific applications running on the receiving terminal 214 and the mobile terminal 210 will determine the sequence of the API calls made between the mobile terminal 210, the receiving terminal 214, the server 212 and the payment interface server 346, along with commands and processing required to complete a transaction between the mobile terminal 210 and the receiving terminal 214. Accordingly, the sequence of the API calls shown in FIG. 6 is non exhaustive.

The receiving terminal 214 calls 650 the server 212 to look up the storage slot created as described in FIGS. 2 to 5. This call 650 may be made with the unique identifier. The server 212 then returns 652 a message to the receiving terminal 214 that the storage slot has been created and provides details of the storage slot. The receiving terminal 214 indicates 654 to the server 212 that the storage slot will be used to store transaction data that is exchanged during the transaction that occurs over the communication link 216. The server 212 then returns 656 a message to the receiving terminal 214 that the storage slot has been configured to store, provide and exchange (e.g. update) the transaction data and provides details of the storage slot.

The mobile terminal 210 calls 658 the server 212 to verify that the storage slot has been configured to be ready for the exchange of transaction data. The server 212 then returns 660 a message to the mobile terminal 210 that the storage slot has been so configured and provides details of the storage slot which allow the mobile terminal 210 to pair with the receiving terminal 214. A further call 662 and return 664 may occur between the mobile terminal 210 and the server 212 to obtain specific details of the storage slot.

At the point where the mobile terminal 210 is initialized to make payment for purchased goods and/or services, such as through the use of a digital wallet, the mobile terminal 210 may send 666 a message to the server 212 to configure the storage slot to store details of the payment. The server 212 may then return 668 a message to the mobile terminal 210 that the storage slot is ready to store payment details.

As payment may require tapping into external systems that are used to process the payment, the server 212 has to communicate with the payment interface server 346 that is configured to communicate with such external systems. The payment interface server 346 calls 670 the server 212 to look up payment tokens (i.e. payment details) in the storage slot. The server 212 then returns 672 the payment details stored in the storage slot of the server 212. After the payment has been processed by external systems, the payment interface server 346 informs 674 the server 212 that payment has been made. The server 212 then acknowledges 676 to the payment interface server 346 that the storage slot has been updated to reflect that payment has been processed.

With the payment having been processed, the receiving terminal 214 can then create a digital receipt that is sent 678 to the server 212 for storage in the storage slot. The server 212 then returns 680 a message to the receiving terminal 214 that the digital receipt has been created.

The mobile terminal 210 sends 682 to the server 212 a request for the digital receipt by, for example, using the unique identifier. The mobile terminal 210 then receives 684 the receipt in response to the mobile terminal 210 requesting for the receipt using the unique identifier. It will be appreciated that before the receipt is retrieved, both the receiving terminal 214 and the mobile terminal 210 may verify that the payment has been completed.

Another objective that may be achieved by the method shown in FIG. 1A is facilitating the management of the redemption of value added services (VAS), such as any one or more of coupons, discounts, offers and loyalty program points. The terms "loyalty program", "loyalty points" and similar will be interchangeably used with the terms "rewards programs", "rewards points" and similar.

Figure 7:
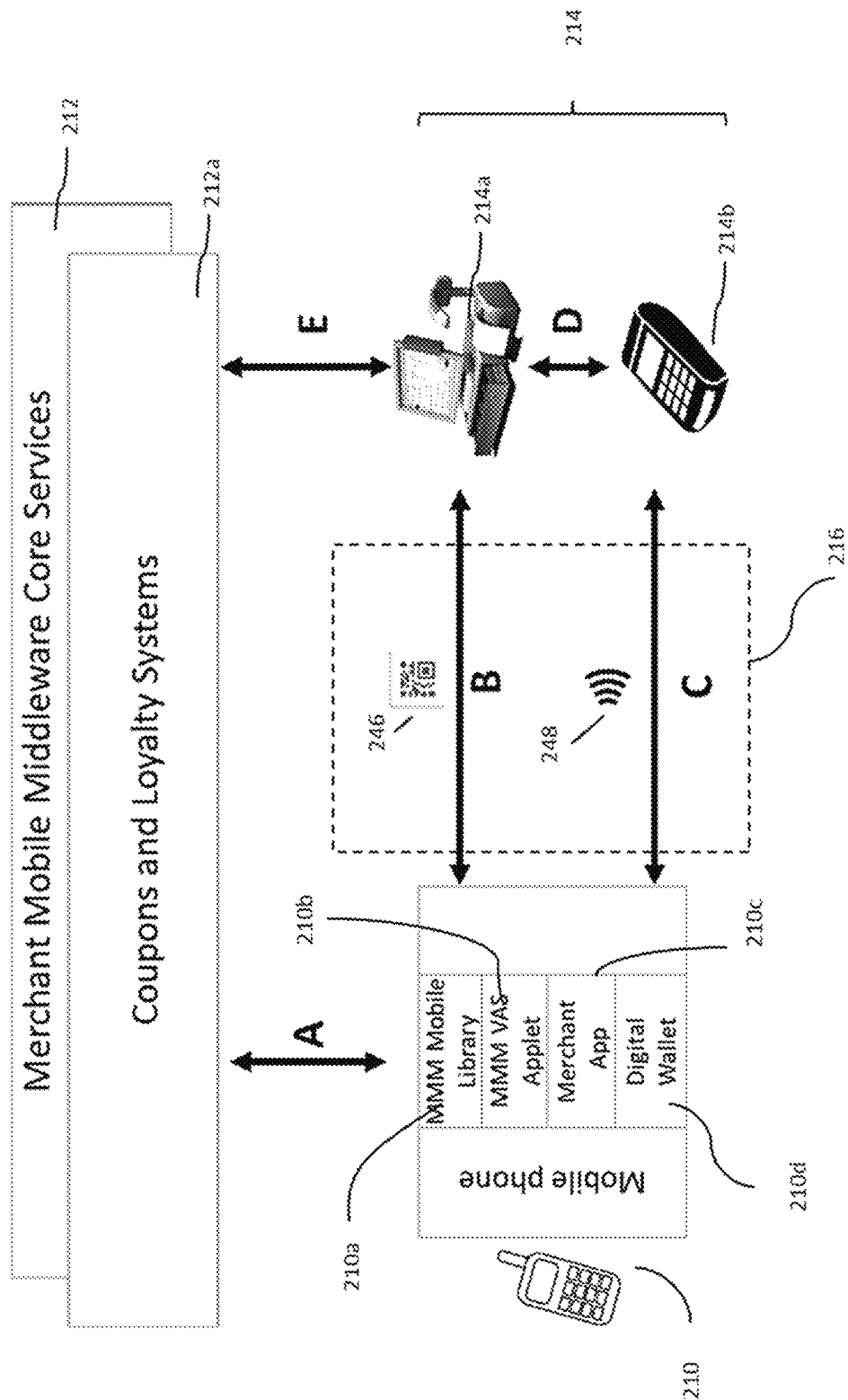
FIG. 7 shows major blocks in a coupon and loyalty model which implements the method described in FIG. 1A.

FIG. 7 shows major blocks in a coupon and loyalty model which implements the method described in FIG. 1. The components involved in FIG. 6 are the same as those described with respect to FIGS. 2 to 5, i.e. a mobile terminal 210, a receiving terminal 214 and a server 212 that administers a communication link 216 over which transaction data is transmitted between the mobile terminal 210 and the receiving terminal 214. The receiving terminal 214 may comprise a POS terminal 214a and a payment terminal 214b.

The major blocks of the mobile terminal 210 include a library 210a, a VAS applet, a merchant application 210c and a digital wallet application 210d. The library 210a provides a repository of commands that facilitate communication between the mobile terminal 210, the server 212 and the receiving terminal 214. The merchant application 210c is an application that provides a graphic user interface through which a user accesses to select and redeem value added services, where the merchant application 210c uses both the VAS applet 210b and the library 210a to communicate with the mobile terminal 210 and/or the receiving terminal 214 to redeem selected value added services. The digital wallet application 210d is an application that stores details of electronic payment cards that can be used to pay good and/or services and is separate to the merchant application 210c. The major block of the server 212 is a coupon and loyalty processing block 212a.

The interactions A, B, C and D shown in FIG. 7 are described below.

In interaction A, coupons are provisioned to the mobile terminal 210 through the merchant application 210a for the user to browse, save and use. Redeemed coupons are also synchronized at a backend. Loyalty cards are registered to the mobile terminal 210 and a loyalty ID is created, which may be the primary identifier of the loyalty card. The merchant application 210a also synchronizes to the loyalty system to update a balance in a loyalty account stored in the mobile terminal 210.

Interactions B and C are for data exchange that facilitates VAS redemption. Coupons and loyalty ID may be transferred via NFC 248 or QR Code 246 from the VAS applet 210b to a VAS kernel in the payment terminal 214b or to a OR code reader of the POS terminal 214a. Before this exchange of transaction data relating to redemption of value added services occurs, authentication of the mobile terminal 210 to the receiving terminal 214 may be performed. The authentication is described with reference to either one of FIGS. 2 to 5.

Figure 17:
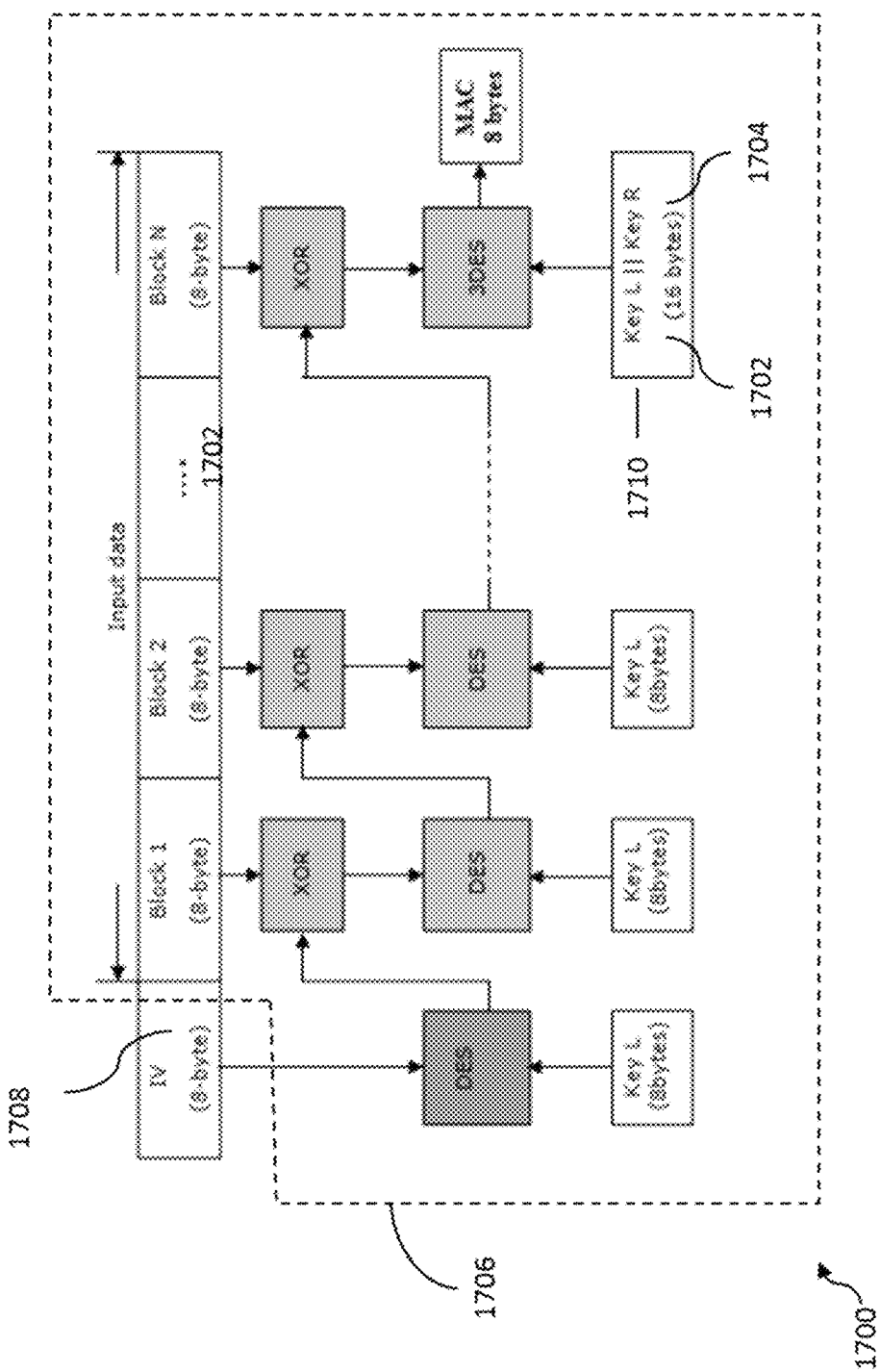
FIG. 17 shows a schematic of a data packet that results from performing authentication of a mobile terminal before exchange of transaction data relating to the redemption of value added services.

The mobile terminal 210 retrieves an authentication code stored in the storage slot of the server 212. The receiving terminal 214 receives the authentication code from the mobile terminal 210 and compares the received authentication code against an authentication code generated by the receiving terminal 214 based on data from the mobile terminal. The mobile terminal 210 is then authenticated in response to confirmation of a match between the received authentication code and the generated authentication code. A schematic of the data packet that is created while performing this match is shown in FIG. 17 and described later in greater detail. The authentication code may be stored in the storage slot in response to the receiving terminal 214 transmitting the authentication code, stored in the receiving terminal 214, to the server 212. The authentication code may be generated in the receiving terminal 214 using an encryption key kept in the receiving terminal 214.

In the interaction C for data exchange using NFC; if the payment terminal 214b is configured to perform instant redemption of coupon and loyalty points, an updated transaction total can be calculated and payment carried out in a single tap of the mobile terminal 210. Otherwise, the payment terminal 214b passes the received coupon and loyalty details to the POS terminal 214a for redemption. When a new transaction total is calculated, after the application of the redeemed coupon and loyalty points, the customer is prompted to tap the mobile terminal 210 again at the payment terminal 214b so as to effect payment through the digital wallet application 210d.

In interaction D, loyalty points earned or redeemed and payment status is exchanged between the POS terminal 214a and the payment terminal 214b.

In interaction E, data is exchanged that allows synchronization of the loyalty points after payment is completed. The synchronization that occurs in interaction E updates a balance in a loyalty account stored in the receiving terminal 214. With reference to the interaction A, there is synchronization of a balance of a loyalty account stored in the mobile terminal 210 and the receiving terminal 214. This synchronization occurs in response to an exchange, between the mobile terminal 210 and the receiving terminal 214, of the data used to facilitate the redemption of the value added services. The loyalty account in both the mobile terminal 210 and the receiving terminal 214 are thus updated when there is redemption of value added services.

Figure 8:
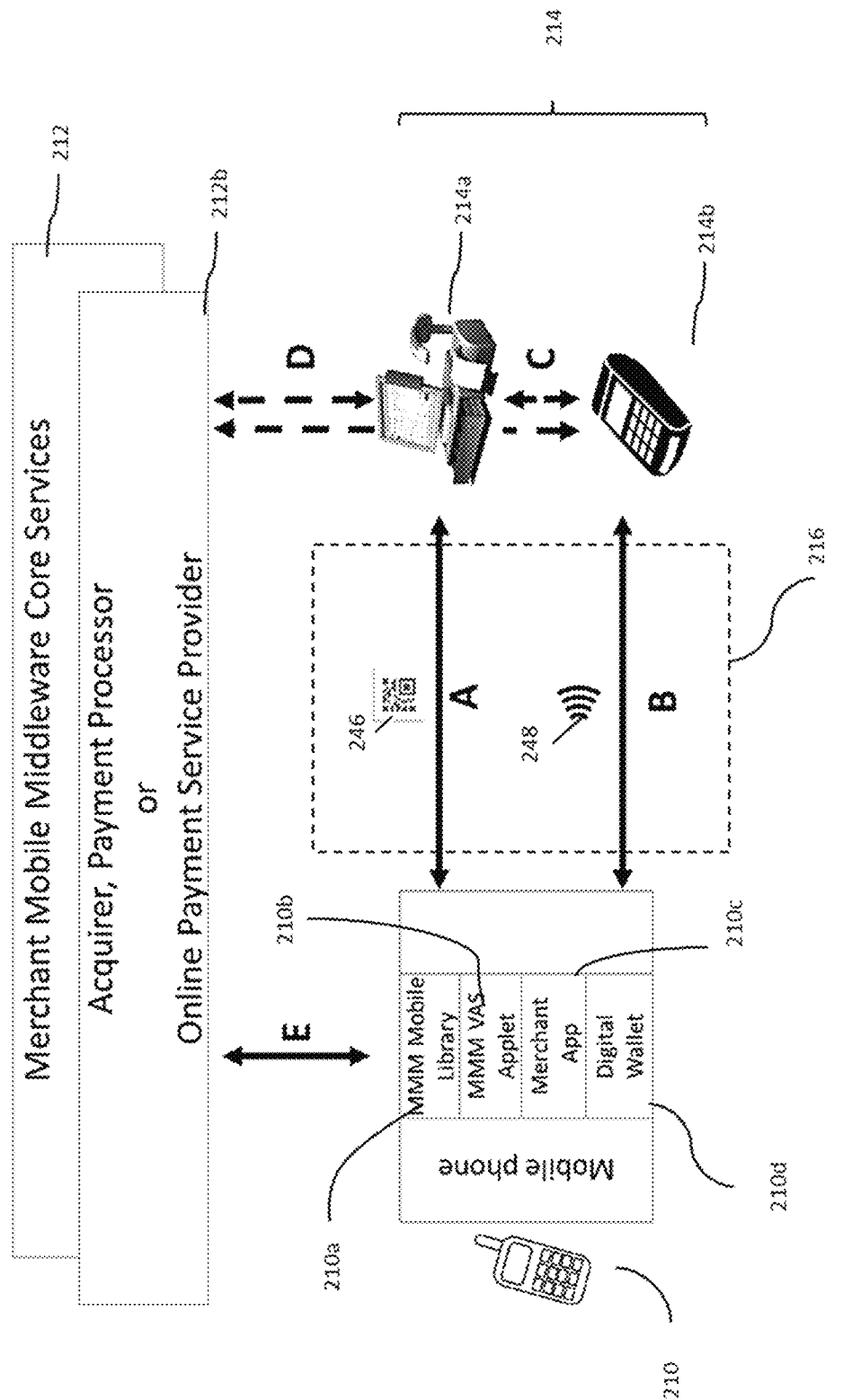
FIG. 8 shows major blocks in a payment model which implements the method described in FIG. 1A.

FIG. 8 shows major blocks in a payment model which implements the method described in FIG. 1. The components involved in FIG. 7 are the same as those described with respect to FIGS. 2 to 5, i.e. a mobile terminal 210, a receiving terminal 214 and a server 212 that administers a communication link 216 over which transaction data is transmitted between the mobile terminal 210 and the receiving terminal 214. The receiving terminal 214 may comprise a POS terminal 214a and a payment terminal 214b.

The major blocks of the mobile terminal 210 are as described with reference to FIG. 7. The major block of the server 212 is a payment processing block 212b.

The interactions A, B C, D and E shown in FIG. 8 are described below.

In interaction A, use of the OR code 246 to initiate payment will have the mobile terminal 210 pass information required to start or inform the POS terminal 214a of a process used to make payment. This could be via an online payment between the mobile phone 210 and an online payment service provider, accessible through the payment processing block 212b via interaction E, a card-on-file payment between the POS terminal 214a and a payment processor, accessible through the payment processing block 212b via interaction D, or any other form of remote payment.

In interaction B, processing of NFC 248 based payment will follow an agreement method, known by those skilled in the art, for performing a NFC based contactless payment between the mobile terminal 210 and the payment terminal 214b.

Interaction C occurs between the POS terminal 214a and the payment terminal 214b if the payment terminal 214b connects to an acquirer (i.e. a merchant's bank) through the POS terminal 214a. On the other hand, the payment terminal 214b may connect to the acquirer directly, i.e. without the need for interaction C.

Interaction D provides a connection, through the payment processing block 212b, to support communication with an acquirer, a payment processor or an online payment service provider when the mobile terminal 210 uses a OR code 246 to initiate payment. This will allow the POS terminal 214a to be updated with an outcome of the remote payment process. The core services provided by the server 212 thus allows for simple merchant implementation of a remote connection to facilitate such a remote payment.

Interaction E provides a connection for OR Code 246 based transaction, by allowing the mobile terminal 210 to be paired with the POS terminal 214a via the server 212, allows remote payment to take place when initiated via the mobile terminal 210. The connection provided by interaction E can also be used for the delivery of an electronic receipt (for both the OR code 246 and NFC 248 cases).

Figure 9:
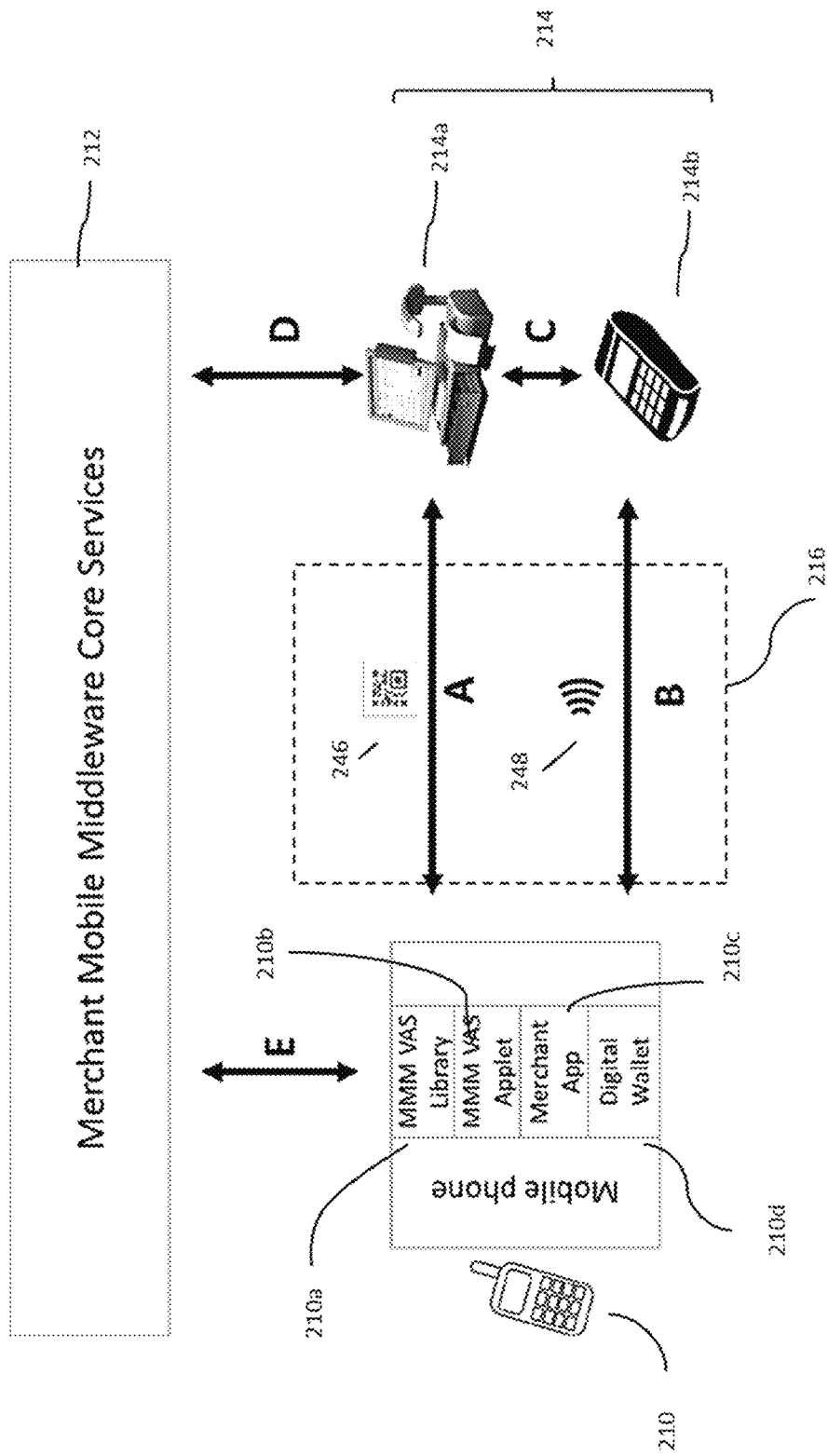
FIG. 9 shows major blocks in a model which provides a digital receipt, wherein the model implements the method described in FIG. 1A.

FIG. 9 shows major blocks in a model which provides a digital receipt, wherein the model implements the method described in FIG. 1. The components involved in FIG. 9 are the same as those described with respect to FIGS. 2 to 5, i.e. a mobile terminal 210, a receiving terminal 214 and a server 212 that administers a communication link 216 over which transaction data is transmitted between the mobile terminal 210 and the receiving terminal 214. The receiving terminal 214 may comprise a POS terminal 214a and a payment terminal 214b.

The major blocks of the mobile terminal 210 are as described with reference to FIG. 7.

The interactions A, B C, D and E shown in FIG. 9 are described below.

In interaction A, a unique identifier or pairing ID is generated in the mobile terminal 210 and transferred to the POS terminal 214a via a OR Code 246. Similarly, in interaction B, a unique identifier or pairing ID is passed from the mobile terminal 210 to the payment terminal 214b via an NFC 248 tap. Further detail on interactions A and B was described earlier with reference to FIG. 2.

In interaction C, the payment terminal 214b will pass on the unique identifier, received by the NFC tap, to the POS terminal 214b.

Interaction D occurs after payment is successfully processed, where the POS terminal 214b will push the unique identifier and receipt information to the core services of the server 212.

In interaction E, the merchant application 210c will pull the receipt information from the core services of the server 212 using the unique identifier as the transaction identifier.

Figure 10:
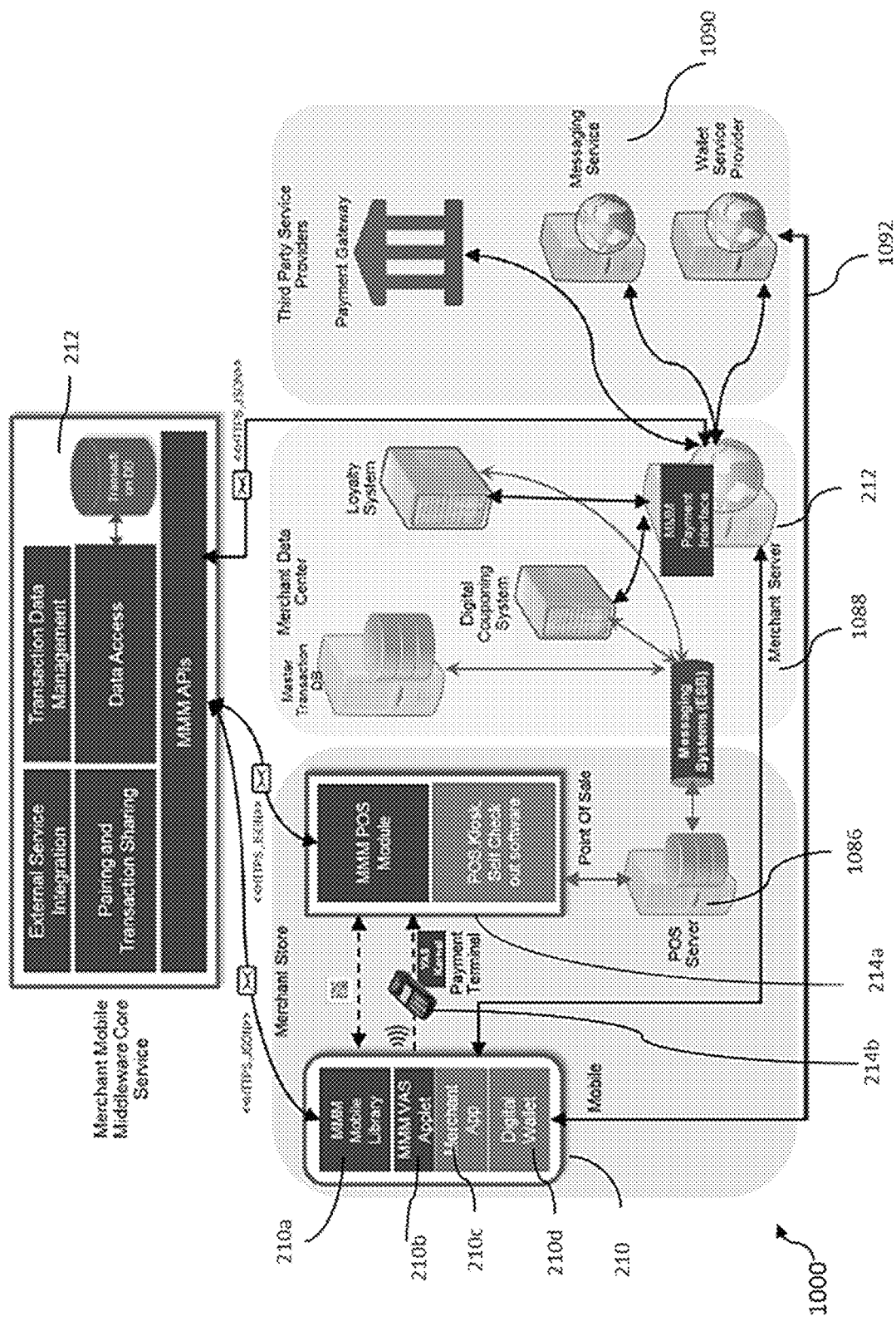
FIG. 10 shows an architectural schematic of a system that uses the server described with reference to FIGS. 2 to 9.

FIG. 10 shows an architectural schematic of a system 1000 that uses the server 212 described with reference to FIGS. 2 to 9. The various components of the mobile terminal 210, the POS terminal 214a, the payment terminal 214b are as described above. The digital wallet application 210d of the mobile terminal 210 communicates 1092 with third party service providers 1090 using a communication technique that is known by those skilled in the art. FIG. 10 also shows that the server 212 is part of merchant data centre 1088 hardware. However, it will be appreciated that the server 212 may be deployed as: a shared cloud service using open API infrastructure; a third party shared service platform offered by payment Terminal and POS vendors; or a retailer owned cloud-based infrastructure.

The server 212 enables a seamless shopping experience by combining value added services (VAS) for loyalty, coupons, vouchers or rewards with mobile terminal 210 payment at a merchant store. In FIG. 10, the merchant data centre 1088 includes systems for administering loyalty points, digital coupons and for keeping loyalty point records of an account holder.

The server 212 provides a means to pair the mobile terminal 210 and the receiving terminal 214 at a merchant store, by facilitating the establishment of a communication link 216 (see FIGS. 2 to 5) between the mobile terminal 210 and the receiving terminal 214. The pairing of the mobile terminal 210 with the receiving terminal 214 enables the sharing of transaction details between the mobile terminal 210 and the receiving terminal 214. The mobile terminal 210 can also retrieve transaction data for value added service redemptions and for a digital receipt.

The core services of the server 212 are designed to provide flexibility allowing different implementations to be deployed depending on the merchant requirements and the distribution of services across different value added and payment service providers. The four process flows 200, 300, 400 and 500 of FIGS. 2 to 5 provide four different implementations, although other implementations would be realizable by those skilled in the art.

The core services of the server 212 comprise six modules, namely APIs, pairing and transaction sharing, transaction DB (database), data access, transaction data management; and external service integration, where each has dedicated functionality as described below.

The APIs module is a set of RESTFul APIs exposed for external access. Representational State Transfer (REST) is an architectural style that specifies constraints, such as a uniform interface, that if applied to a web service induces desirable properties, such as performance, scalability, and modifiability that enable services to work best on the Web. In the REST architectural style, data and functionality are considered resources and are accessed using Uniform Resource Identifiers (URIs), typically links on the Web. The resources are acted upon by using a set of simple, well-defined operations. The REST architectural style is constrained to a client/server architecture and is designed to use a stateless communication protocol, typically HTTP. In the REST architecture style, clients and servers exchange representations of resources by using a standardized interface and protocol. The APIs act as a gateway for the other core services provided by the server 212. Mobile applications and other components can access the exposed APIs to execute defined functions. There is no business or decision logic associated with this component, the process would be to accept incoming requests from external components and extract the payload or data and pass this as a request message to another core service component which has the business processing logic to execute the request. The response to a request is also delivered back to the external component that sent the request.

The pairing and transaction sharing module is used to pair or virtually integrate the mobile terminal 210 with the receiving terminal 214 for a current transaction. The mobile terminal 210 and the receiving terminal 214 can be paired by calling the specific pairing APIs provided by the core services of the server 212

The transaction DB module provides persistent storage of transaction data. The Transaction DB can be accessed via a data access component. Transaction data will be used for value added services redemption and for providing digital receipts, savings comparison and analytics.

The data access module is used to retrieve and store supported data from the Transaction DB. This module abstracts all the database activities from other components in the core services of the server 212. This component will manage database connection, query statement execution and store procedure execution. Other components may use the data access module to execute transaction DB related operations.

The transaction data management module will manage the transaction data held on the transaction DB module. This module will store the transaction status and digital receipts retrieved from the receiving terminal 214.

The external service integration module is used to integrate external services into the server 212. External service can be third party loyalty service providers or other VAS providers.

Figure 11:
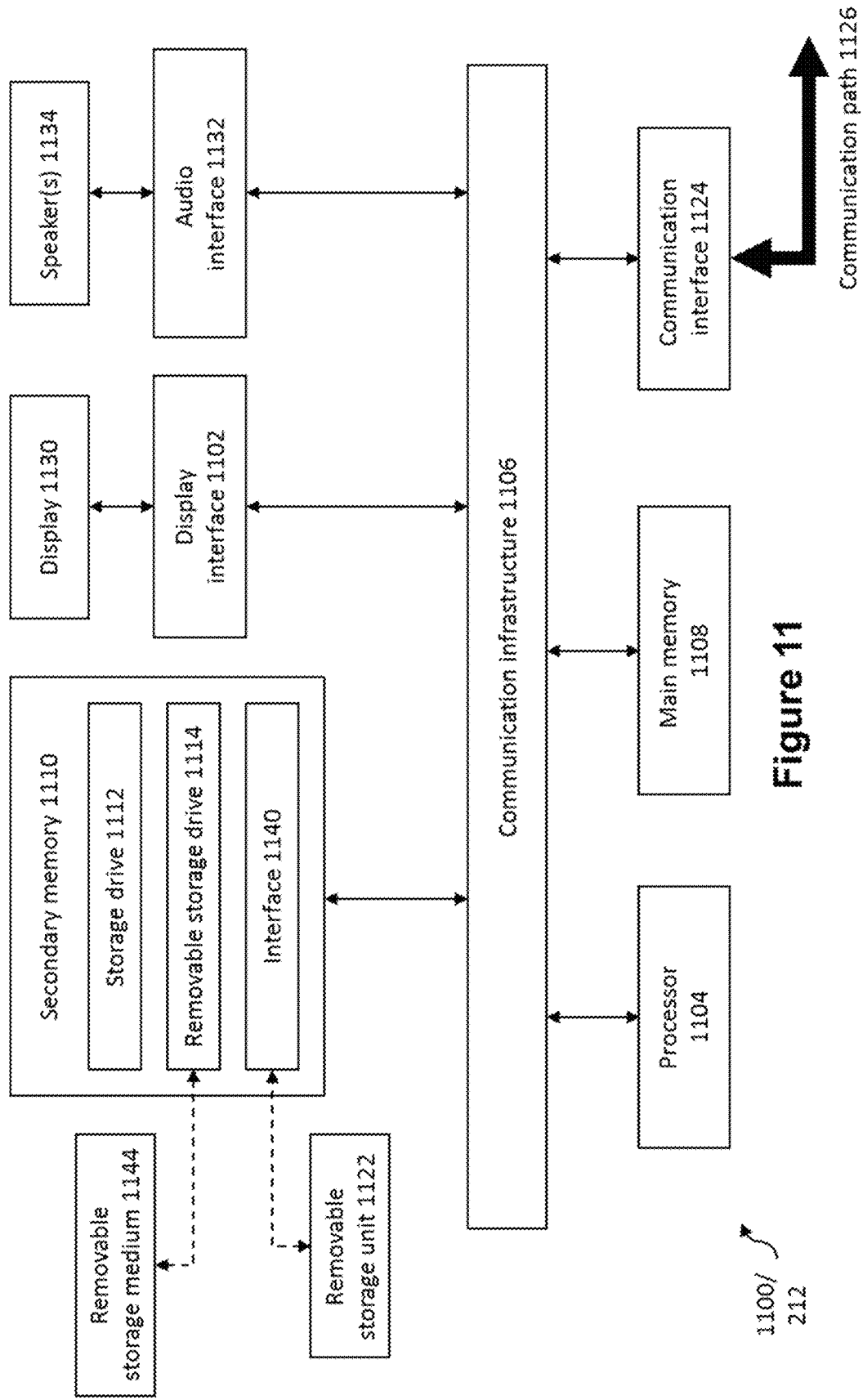
FIG. 11 depicts an exemplary computing device used to execute the method described in FIG. 1.

FIG. 11 depicts an exemplary computing system 1100, hereinafter interchangeably referred to as a computer device 1100, where one or more such computing systems or devices 1100 may be used to execute the method described in FIGS. 1B to 1F for modifying transaction credentials. The computing system or systems 1100 may represent one or more of the mobile terminal 210, server 212 and receiving terminal 214, among other parties to a transaction. Thus, while the computing system 1100 may be described with reference to a particular one or ones of the mobile terminal 210, server 212 and receiving terminal 214, it will be appreciated that the computing system 1100 may represent all of the mobile terminal 210, server 212 and receiving terminal 214, and any third parties such as value added services providers, or may represent only a subset of those parties as context requires. The following description of the computing system 1100 is provided by way of example only and is not intended to be limiting.

As shown in FIG. 11, the example computing system 1100 includes a processor 1104 for executing software routines. Although a single processor is shown for the sake of clarity, the computing system 1100 may also include a multi-processor system. The processor 1104 is connected to a communication infrastructure 1106 for communication with other components of the computing system 1100. The communication infrastructure 1106 may include, for example, a communications bus, cross-bar, or network.

The computing system 1100 further includes a main memory 1108, such as a random access memory (RAM), and a secondary memory 1110. The secondary memory 1110 may include, for example, a storage drive 1112, which may be a hard disk drive, a solid state drive or a hybrid drive and/or a removable storage drive 1114, which may include a magnetic tape drive, an optical disk drive, a solid state storage drive (such as a USB flash drive, a flash memory device, a solid state drive or a memory card), or the like. The removable storage drive 1114 reads from and/or writes to a removable storage medium 1144 in a well-known manner. The removable storage medium 1144 may include magnetic tape, optical disk, non-volatile memory storage medium, or the like, which is read by and written to by removable storage drive 1114. As will be appreciated by persons skilled in the relevant art(s), the removable storage medium 1144 includes a computer readable storage medium having stored therein computer executable program code instructions and/or data.

In an alternative implementation, the secondary memory 1110 may additionally or alternatively include other similar means for allowing computer programs or other instructions to be loaded into the computing system 1100. Such means can include, for example, a removable storage unit 1122 and an interface 1140. Examples of a removable storage unit 1122 and interface 1140 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1122 and interfaces 1140 which allow software and data to be transferred from the removable storage unit 1122 to the computing system 1100.

The computing system 1100 also includes at least one communication interface 1124. The communication interface 1124 allows software and data to be transferred between computing system 1100 and external devices via a communication path 1126. In various embodiments of the inventions, the communication interface 1124 permits data to be transferred between the computing system 1100 and a data communication network, such as a public data or private data communication network. The communication interface 1124 may be used to exchange data between different computing systems 1100 which such computing systems 1100 form part an interconnected computer network. Examples of a communication interface 1124 can include a modem, a network interface (such as an Ethernet card), a communication port (such as a serial, parallel, printer, GPIB, IEEE 1394, RJ45, USB), an antenna with associated circuitry and the like. The communication interface 1124 may be wired or may be wireless. Software and data transferred via the communication interface 1124 are in the form of signals which can be electronic, electromagnetic, optical or other signals capable of being received by communication interface 1124. These signals are provided to the communication interface via the communication path 1126.

As shown in FIG. 11, the computing system 1100 further includes a display interface 1102 which performs operations for rendering images to an associated display 1130 and an audio interface 1132 for performing operations for playing audio content via associated speaker(s) 1134.

As used herein, the term "computer program product" may refer, in part, to removable storage medium 1144, removable storage unit 1122, a hard disk installed in storage drive 1112, or a carrier wave carrying software over communication path 1126 (wireless link or cable) to communication interface 1124. Computer readable storage media refers to any non-transitory, non-volatile tangible storage medium that provides recorded instructions and/or data to the computing system 1100 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing system 1100. Examples of transitory or non-tangible computer readable transmission media that may also participate in the provision of software, application programs, instructions and/or data to the computing system 1100 include radio or infra-red transmission channels as well as a network connection to another computer or networked device, and the Internet or Intranets including e-mail transmissions and information recorded on Websites and the like.

The computer programs (also called computer program code) are stored in main memory 1108 and/or secondary memory 1110. Computer programs can also be received via the communication interface 1124. Such computer programs, when executed, enable the computing system 1100 to perform one or more features of embodiments discussed herein. In various embodiments, the computer programs, when executed, enable the processor 1104 to perform features of the above-described embodiments. Accordingly, such computer programs represent controllers of the computer system 1100.

Software may be stored in a computer program product and loaded into the computing system 1100 using the removable storage drive 1114, the storage drive 1112, or the interface 1140. Alternatively, the computer program product may be downloaded to the computer system 1100 over the communications path 1126. The software, when executed by the processor 1104, causes the computing system 1100 to perform the method as described in FIGS. 1B to 1F.

It is to be understood that the embodiment of FIG. 11 is presented merely by way of example. Therefore, in some embodiments one or more features of the computing system 1100 may be omitted. Also, in some embodiments, one or more features of the computing system 1100 may be combined together. Additionally, in some embodiments, one or more features of the computing system 1100 may be split into one or more component parts.

It will be appreciated that the elements illustrated in FIG. 11 function to provide means for performing the method as described with respect to FIGS. 1B to 1F. For example, the computing system 1100 may be used to realise the server 118 shown in FIGS. 1D, 1E and 2 to 10. As described in relation to FIGS. 1D and 1E, the server facilitates a method for modifying transaction credentials. The server 118 comprises at least one processor 1104 and at least one memory 1108 including computer program code. Similarly, the computing system 1100 may be used to realise the receiving terminal 116 shown in FIGS. 1D, 1E and 2 to 10. In this case the receiving terminal 116 comprises at least one processor 1104 and at least one memory 1108 including computer program code.

The memory of the receiving terminal 116 and server 118 comprises (e.g. stores) the computer program code configured to, with the at least one processor of the receiving terminal 116, cause the receiving terminal to: initiate a transaction defined by one or more transaction credentials; and receive mobile terminal data from the mobile terminal 114 (by transmission of that data from the mobile terminal 114), the mobile terminal data comprising at least a partial set of account data relating to the mobile terminal. The computer program code is also configured to 118, with the at least one processor of the server 118, cause the server 118 to: extract the set of account data from the mobile terminal data at the server; and transmit the set of account data from the server 118 to an account manager, the set of account data being associated with a unique consumer account managed by the account manager 120. The receiving terminal 116 may also be caused to receive one or more transaction modifiers associated with the consumer account; and modify at least one of the one or more transaction credentials based on the one or more transaction modifiers.

In some implementations, the processor 1104 of the receiving terminal 214 may be further configured to execute the transaction using the one or more modified transaction credentials. In this manner, a merchant may offer value added services to a consumer with the need to change the payment terminal or provide additional infrastructure than would be required to fulfil POS transactions using payment terminals in a traditional manner.

In some implementations, the processor 1104 of the server 118 may be further configured to extract the set of account data by identifying the account manager 120 from a plurality of account managers based on the mobile terminal data. The mobile terminal data may comprise a plurality of different sets of account data, each set of account data from the plurality of different sets of account data relating to a consumer account managed by a respective account manager 120 from the plurality of account managers.

The computing device 1100 of FIG. 11 may execute the method shown in FIG. 1B when the computing system 1100 executes instructions which may be stored in any one or more of the removable storage medium 1144, the removable storage unit 1122 and storage drive 1112. These components 1122, 1144 and 1112 provide a non-transitory computer readable medium having stored thereon executable instructions for controlling the server 118, realised by the computing system 1100, to perform steps comprising: a) initiating a transaction at a receiving terminal 116, the transaction being defined by one or more transaction credentials; b) transmitting mobile terminal data from a mobile terminal 114, via the receiving terminal 116, to a server 118, the mobile terminal data comprising a set of account data relating to the mobile terminal 114; c) extracting the set of account data at least partially from the mobile terminal data at the server 118; d) transmitting the set of account data from the server 118 to an account manager 120, the set of account data being associated with a unique consumer account managed by the account manager 120; e) receiving, at the receiving terminal 116, one or more transaction modifiers associated with the consumer account; and f) modifying at least one of the one or more transaction credentials based on the one or more transaction modifiers.

From FIGS. 1B to 1F, along with the accompanying description, the overall function of the server 118 is to provide an interface through which a receiving terminal can provide access to account managers (e.g. VAS providers) 120 without warranting expensive infrastructure at the receiving terminal 116 and without significantly increasing the processor workload at the receiving terminal 116. The server 118 also seamlessly integrates the provision of value-added services with the electronic, NFC checkout experience. This is achieved through the integration controller 164 which receives data from the receiving terminal 116 and forwards that data is a form useable for a particular account manager 120. Moreover, the integration controller 164 also determines, based on the data received from the receiving terminal 116, which account manager 120 is relevant to a particular transaction. From the consumer perspective, the integration controller 164, and the related communication between the integration layer 164 and each of the receiving terminal 116 and account managers 120, facilitates use of use of loyalty rewards programs and offers (e.g. coupons and discounts) wherever a receiving terminal 116 is available for tap-to-pay, and thus enables the same loyalty app or program to be used more universally than previous loyalty program implementations. From the merchant perspective, the merchant has access to premium loyalty programs that would previously have required high upfront capital investment in infrastructure, and the ongoing costs relating to upkeep and support for value added services. Moreover, merchants can accept a wide range of value added services with the transaction credentials being updated as appropriate, for each service, at the receiving terminal 116 without additional work on the part of the merchant. From the account manager perspective, it broadens the market of available businesses that have the technical capability to make use of the value added services.

The receiving terminal 116 and server 118 similarly enable electronic (e.g. digital wallet) payment and return of an electronic receipt to the mobile terminal 114 through the server 118.

The app or program on the mobile terminal 114, that interacts with the receiving terminal 116 to make use of value added services, may be operated and proprietary to a merchant or provided by a third party such as a VAS provider or account manager 120. In one implementation, value added services are redeemed or reversed (such as coupons) using an architecture such as the one shown in FIG. 1D. The mobile terminal 114 may also use a merchant application, such as merchant application 210c shown in FIG. 7, to facilitate the redemption of value added services and the digital wallet application 210d for payment. It will be appreciated that the server architecture of FIG. 7 can be readily modified to include the integration controller 164 and resultant access to VAS providers 120 per the architecture in FIG. 1D by substituting the server 212 for server 118.

To redeem value added services, the mobile terminal 114 may use one or more VAS provider applications (interchangeably referred to as "a redemption application"), configured to facilitate the redemption of value added services, to communicate with the receiving terminal 116. Such redemption applications are each associated with a merchant providing the value added services or with a VAS provider providing a loyalty program with which the merchant has registered.

Figure 12:
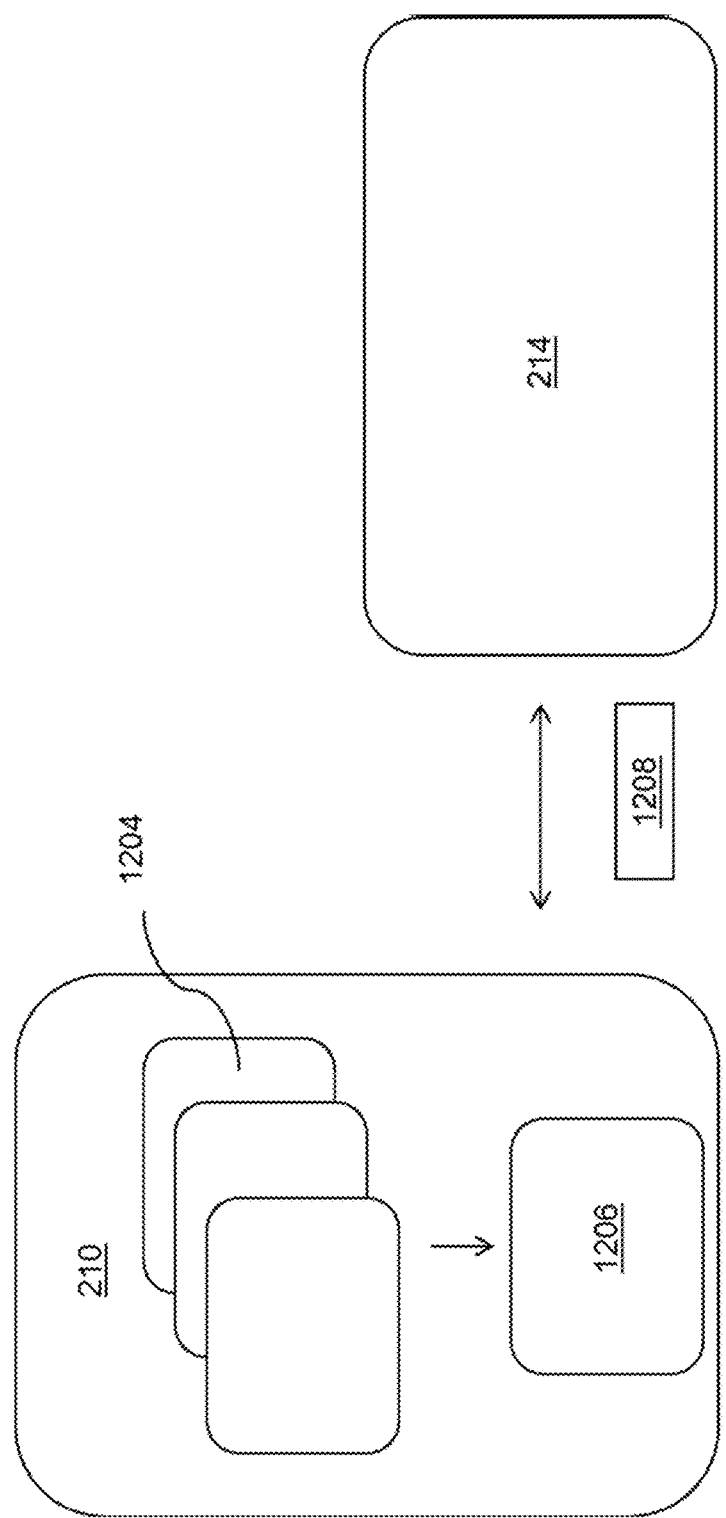
FIG. 12 shows a schematic of an architecture used to standardise data communication to facilitate exchange of data between a mobile terminal and a receiving terminal for the redemption of value added services.

FIG. 12 shows a schematic of an architecture used to standardise data communication between a plurality of redemption applications 1204 each configured to facilitate redemption of value added services, wherein the plurality of redemption applications 1204 are installed in the mobile terminal 114, and a processing network 214 configured to process the value added services transmitted by the mobile terminal 114, the processing network resulting from communication between the receiving terminal 116, server 118 and VAS providers 120, with the VAS provider 120 identifying value added services to which the consumer is entitled based on a consumer account associated with the consumer and managed by the VAS provider 120.

To standardise data communication between the plurality of redemption applications 1204 installed in the mobile terminal 114 and the processing network 214, a bridging application 1206 may be installed in the mobile terminal 114. The bridging application 1206 is activated to establish communication between the plurality of redemption applications 1204 installed in the mobile terminal 114 and the processing network 214. The communication facilitates the redemption of the value added services, wherein the bridging application 1206 standardises the communication by instituting a set of commands used by the plurality of redemption applications 1204 and the processing application to transmit and receive data 1208 (represented as a data packet) that facilitates the redemption of the value added services. If a bridging application 1206 is employed at the mobile terminal 114 then it may be that the mobile terminal data comprises a standard data set. It may therefore be difficult for the integration controller 164 to determine which VAS provider 120 is to be associated with a particular transaction. Thus, particularly where a bridging application is used 1206, the receiving terminal 116 may transmit additional information, along with the mobile terminal data, to the server 118 so that the integration controller 164 in the server 118 can identify the appropriate VAS provider 120 for the transaction.

The bridging application 1206 may be implemented as an applet or a HCE (Host Card Emulation) application. The bridging application 1206 acts as a common library to each of the plurality of redemption applications 1204, so that once such a bridging application 1206 is installed in the mobile terminal 114, installation of further redemption applications would not require the reinstallation of the bridging application 1206. This in turn means that each redemption application 1204 would take up less space since they share the common library provided by the bridging application 1206. In addition, the bridging application 1206 ensures compatibility between the processing network and each of the redemption applications 1204. This is achieved, for example, by the plurality of redemption applications 1204 and the processing network each comprising a library having a repository of commands that allows the bridging application 1206 to communicate with each of the plurality of redemption applications 1204 and the bridging application 1206 to communicate with the processing network. It will be appreciated that, in the architecture diagram of FIG. 1D, the integration controller 164 can make a common library redundant since the integration controller 164 determines, based on different inputs having different formats and content, the manner in which the redemption should take place and which VAS provider should be involved in the transaction.

Putting aside the integration controller, and considering the circumstance of use of a bridging application 1206, the set of commands used by the plurality of redemption applications 1206 comprise internal commands, wherein the internal commands are used within the mobile terminal 210 (see FIG. 7) to transmit and receive, between the bridging application 1006 and the plurality of redemption applications 1204, the data 1208 used for the redemption of the value added services. These internal commands are recognized by each of the plurality of redemption applications 1204. These internal commands include commands that attach information relating to the value added services being redeemed and allow for identification means to be added into the data 1208 to identify the merchant providing the value added services; commands that read coupons being exchanged between the mobile terminal 210 and the receiving terminal 214 through the data 1208; and reset the data 1208. The internal commands are compliant with an operating system of the mobile terminal 210. The set of commands used by the bridging application 1206 and the processing network (or processing application in the case of FIG. 7) are compliant with a protocol used to transmit and receive the data 1208 used for the redemption of the value added services. The protocol is based on NFC communication standard, so that the mobile terminal 210 may use a NFC process to send the data 1208 to the receiving terminal 214. The analogue, digital and protocol layers of the NFC process are, in one implementation, defined by existing ISO and EMV (Europay™, MasterCard™, and Visa™) contactless standards and may, for example, require for the receiving terminal 214 to be EMVCo Level 1 and Level 2 certified.

The processing network (or processing application in the case of FIG. 7) may be configured to detect for the presence of the bridging application 1206 before transmitting the data 1008 that facilitates the redemption of the value added services. At the receiving terminal 214 end, the processing application may apply one or more of commands that set up exchange of the data 1208, between the mobile terminal 210 and the receiving terminal 214 and allow for an update of a coupon status in the receiving terminal 214.

Figure 13:
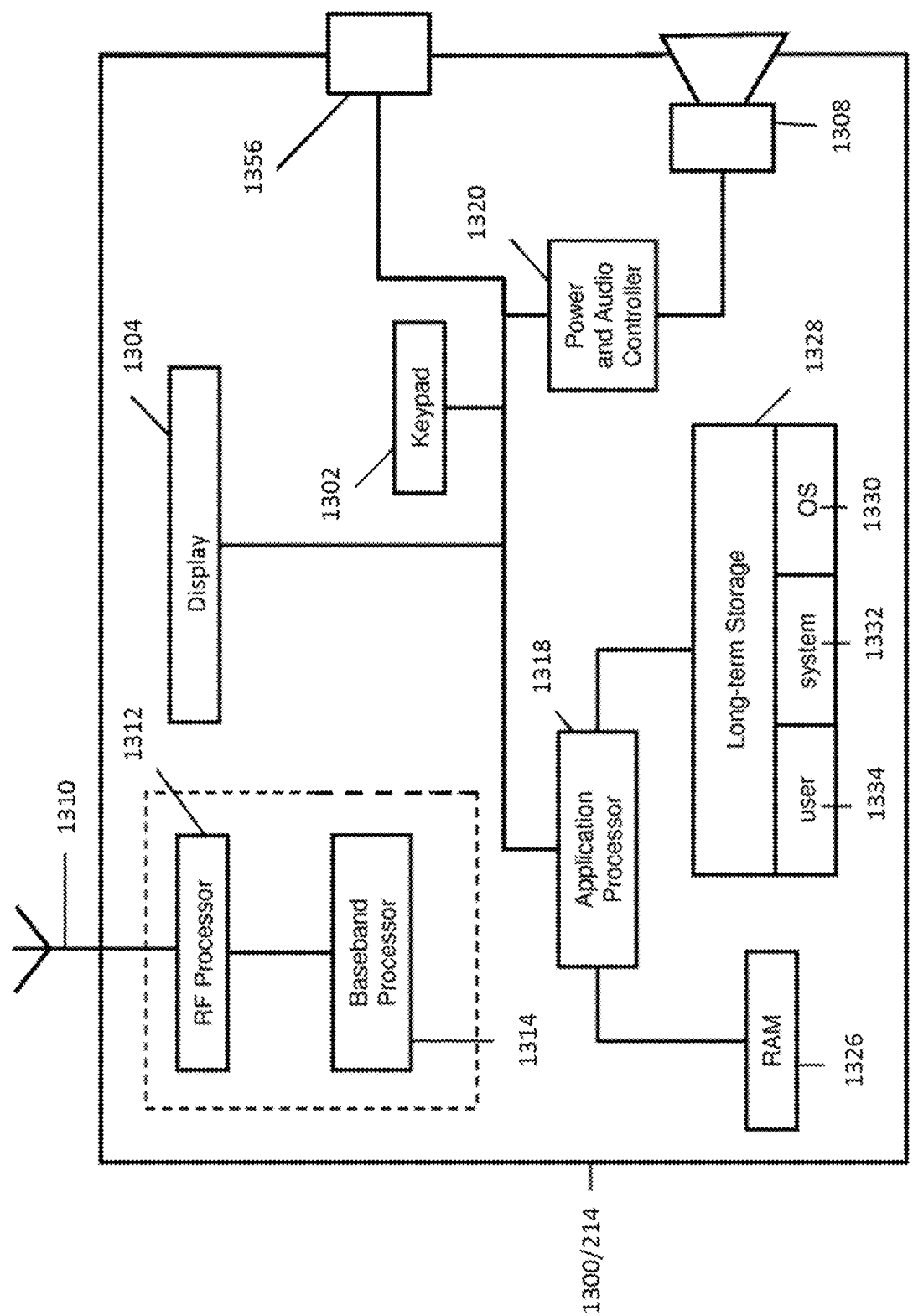
FIG. 13 is a schematic of a computing device used to implement the receiving terminal shown in FIGS. 2 to 10 and 12.

FIG. 13 is a schematic of a computing device 1300 that may be utilized to implement the receiving terminal 116, 214 shown in FIGS. 1B, 2 to 10 and 12. The wireless device 1100 may be in communication (e.g. through NFC or via a OR code) with the mobile terminal 114, 210.

The computing device 1300 comprises a keypad 1302, a display 1304, a speaker 1308 and an antenna 1310. Communication hardware that is used to enable NFC communication with the mobile terminal 210 is represented by RF processor 1312 which provides an RF signal to the antenna 1310 for the transmission of data signals, and the receipt therefrom. Additionally provided is a baseband processor 1314, which provides signals to and receives signals from the RF Processor 1312.

The keypad 1302 and the display 1304 are controlled by an application processor 1318. The display 1304 is used to provide an indication of the status of the receiving terminal 116, 214, such as payment options available when the receiving terminal 116, 214 detects that it is being used to receive electronic payment or that the receiving terminal 116, 214 is processing payment after a payment option is selected through the keypad 1302, A power and audio controller 1320 is provided to supply power to the RF processor 1312 and the baseband processor 1314, the application processor 1318, and other hardware. The power and audio controller 1320 also controls audio output via the speaker 1308. The speaker 1308 is used to provide sounds to indicate that a data transaction with the receiving terminal 116, 214 has been successfully completed.

In order for the application processor 1318 to operate, various different types of memory are provided. Firstly, the computing device 1300 includes Random Access Memory (RAM) 1326 connected to the application processor 1318 into which data and program code can be written and read from at will. Code placed anywhere in RAM 1326 can be executed by the application processor 1318 from the RAM 1326. RAM 1326 represents a volatile memory of the computing device 1300.

Secondly, the computing device 1300 is provided with a long-term storage 1328 connected to the application processor 1318. The long-term storage 1328 comprises three partitions, an operating system (OS) partition 1330, a system partition 1332 and a user partition 1334. The long-term storage 1328 represents a non-volatile memory of the computing device 1300.

In the present example, the OS partition 1330 contains the firmware of the computing device 1300 which includes an operating system. Other computer programs may also be stored on the long-term storage 1328, such as application programs, and the like. In particular, application programs which are mandatory to the computing device 1300 are typically stored in the system partition 1332. The application programs stored on the system partition 1332 would typically be those which are bundled with the computing device 1300 by the device manufacturer when the computing device 1300 is first sold. Application programs which are added to the computing device 1300 by the user would usually be stored in the user partition 1334.

The computing device 1300 also comprises an image capturing module 1356. The image capturing module, together with a suitable application, may be used to capture/scan OR codes and process the data embedded in the OR code.

The receiving terminal 116, 214 is configured to send mobile terminal data, and may also be configured to send additional data, to the server 118, 212. The server 118, 212 then extracts a set of account data from the data supplied by the receiving terminal 116, 214. To process the receipt and transmission of the mobile terminal data, along with additional data if necessary, the at least one processor (e.g. application processor 1318) and the at least one memory (e.g. RAM 1326, long-term storage 1328) with its computer program code are configured to cause the receiving terminal 116, 214 to facilitate initiation of a transaction; receive mobile terminal data from the mobile terminal 114 and transmit it to the server 118, along with additional data if necessary; receive one or more transaction modifiers associated with the consumer account; and modify at least one of the one or more transaction credentials based on the one or more transaction modifiers.

The receiving terminal 116, 214 of FIG. 13 may execute various steps of the method shown in FIG. 1B when the receiving terminal 116, 214 executes instructions which may be stored in any one or more of the RAM 1326 or the long-term storage 1328. These components 1326 and 1328 provide a non-transitory computer readable medium having stored thereon executable instructions for controlling the receiving terminal 214 to perform steps comprising: a) initiate a transaction at a receiving terminal 116, 214, the transaction being defined by one or more transaction credentials; b) transmit mobile terminal data from a mobile terminal 114, 210, via the receiving terminal 116, 214, to a server 118, 212, the mobile terminal data comprising a set of account data relating to the mobile terminal 114, 210; c) receive, at the receiving terminal 116, 214, one or more transaction modifiers associated with the consumer account; and d) modify at least one of the one or more transaction credentials based on the one or more transaction modifiers With reference to FIGS. 7 and 12, the receiving terminal 214 is further configured to host the processing application configured to redeem value added services transmitted by the mobile terminal 210 at which is installed the plurality of redemption applications 1204 configured to facilitate the redemption of the value added services. To facilitate this redemption of value added services, the at least one processor (e.g. application processor 1318) and the at least one memory (e.g. RAM 1326, long-term storage 1328) with its computer program code are configured to cause the receiving terminal 214 at least to detect the presence of the bridging application 1206 installed in the mobile terminal 210, the bridging application 1206 instituting a set of commands used by the plurality of redemption applications 1204 and the processing application to transmit and receive data 1208 that facilitates the redemption of the value added services. The at least one memory and the computer program code are further configured to, with the at least one processor, establish, through the bridging application 1206, communication between the processing application and the plurality of redemption applications 1204 to transmit and receive the data 1208 that facilitates the redemption of the value added services, wherein the data 1208 is transmitted and received through the set of commands instituted by the bridging application to standardise communication between the plurality of redemption applications 1204 and the processing application 1206.

In the implementation shown in FIG. 13, the communication hardware of the RF processor 1312, the antenna 1310 and the baseband processor 1314 detects the presence of the bridging application 1206 installed in the mobile terminal 116, 210. In response to successful detection of the presence of the bridging application 1206, this communication hardware will then establish the communication between the processing application hosted in the receiving terminal 116, 214 and the plurality of redemption applications 1204 at the mobile terminal 114, 210, through the bridging application 1206.

The at least one processor may be further configured to access a library when the processing application communicates with the bridging application 1206. This library comprises a repository of commands compatible with the set of commands of the processing application, so as to provide the at least one processor with the necessary commands that allow communication between the receiving terminal 116, 214 and the mobile terminal 114, 210. This library may exist in a kernel of the at least one memory. Alternatively, this library may be stored in the system partition 1332.

The VAS kernel is an additional software component residing on the receiving terminal 214 that facilitates the NFC process with either or both of receipt of mobile terminal data in any form from an app installed on the mobile terminal 114, 210, or mobile terminal data in a standardised form following use of the bridging application 1206 installed on the mobile terminal 114, 210. With the VAS Kernel deployed into the receiving terminal 116, 214, it will interface with the bridging application 1206 within the mobile terminal 114, 210 to retrieve and process data that facilitates the value added services redemption such as: loyalty ID, coupons, the unique identifier of FIGS. 2 to 6 and other data shared through the Select Application, Exchange Data and Update Coupon Status commands (see FIGS. 14 and 15 described below).

The receiving terminal 214 may be configurable to support a "One-Tap" or "Two-Tap" process in redeeming value added services and completing final payment.

In the "One-Tap" process, the VAS kernel is configured to handle the processes associated with the redemption of value added services. In some embodiments, the retrieved data is processed locally (i.e. without the need to communicate to a separate coupon and loyalty system). In other embodiments, the data (i.e. one or more transaction modifiers) are provided by a VAS provider, via the server 118, 212. The calculation of a balance of the value added service being redeemed (such as loyalty points) will be updated and the mobile terminal 114, 210 continues to execute the final payment process. This is required to allow the receiving terminal 116, 214 to update the total payment amount following the redemption of any value added service and request payment within the time allowed for a single tap transaction to take place, which is expected to be a maximum of 0.5 seconds. In this "One-Tap" process, there is an uninterrupted data communication sequence between the mobile terminal 114, 210 and the receiving terminal 116, 214. During this uninterrupted data communication sequence, there is exchange of data that facilitates the redemption of the value added services and the payment of purchased goods and/or services (i.e. execution of the transaction) from the point of initiation for both to the point of completion for both.

The "Two-Tap" process applies if the VAS kernel is not configured to support local processing of the retrieved data or the data cannot be locally processed. The VAS kernel will act as a pass-through to send the data to, for example a POS terminal 214a if the receiving terminal 114, 214 is a payment terminal 214b (see FIGS. 7 to 9), for further processing of final transaction total. In this "Two-Tap" process, there may be a first data communication sequence between the mobile terminal 114, 210 and the receiving terminal 116, 214. During this first data communication sequence, there is exchange of data that facilitates the redemption of the value added services from the point of initiation to the point of completion. A second data communication sequence between the mobile terminal 114, 210 and the receiving terminal 116, 214 may then follow the first data communication sequence. The second data communication sequence is separate to the first data communication sequence, wherein the first data communication sequence and the second data communication sequence are a time interval apart. During this second data communication sequence, there is exchange of data that facilitates the payment of purchased goods and/or services from the point of initiation to the point of completion. The first data communication sequence may be initiated by one of the plurality of redemption applications 1204, while the second data communication sequence may be initiated by the digital wallet application 210*d* (see FIGS. 7 to 9). Thus the "Two-Tap" process uses two separate and distinct data communication sequences for the redemption of value added services and payment of purchased goods and/or services, in contrast to the uninterrupted data communication sequence used in the "One-Tap" process.

The receiving terminal 116, 214 of FIG. 13 is configured to redeem value added services transmitted by the mobile terminal 210 when the receiving terminal 116, 214 executes instructions which may be stored in any one or more of the RAM 1326 or the long-term storage 1328. These components 1326 and 1328 provide a non-transitory computer readable medium having stored thereon executable instructions to have the receiving terminal 116, 214 interface with a server enabling redemption of value added services. The receiving terminal is controlled to perform steps comprising: a) initiating a transaction at a receiving terminal 116, 214, the transaction being defined by one or more transaction credentials; b) transmitting mobile terminal data from a mobile terminal 114, 210, via the receiving terminal 116, 214, to a server 118, 212, the mobile terminal data comprising a set of account data relating to the mobile terminal 114, 210; c) receiving, at the receiving terminal 116, 214, one or more transaction modifiers associated with the consumer account; and d) modifying at least one of the one or more transaction credentials based on the one or more transaction modifiers. In an alternative embodiment, the receiving terminal 116, 214 may be controlled to perform step comprising a) detecting for the presence of the bridging application 1206 installed in the mobile terminal 210 at which is installed the plurality of redemption applications 1204 configured to facilitate the redemption of the value added services, the bridging application 1206 instituting a set of commands used by the plurality of redemption applications 1204 and the processing application to transmit and receive data 1208 that facilitates the redemption of the value added services; and b) establishing, through the bridging application 1206, communication between the processing application and the plurality of redemption applications 1204 to transmit and receive the data 1208 that facilitates the redemption of the value added services, wherein the data is transmitted and received through the set of commands instituted by the bridging application 1206 to standardise communication between the plurality of redemption applications 1204 and the processing application.

Figure 14:
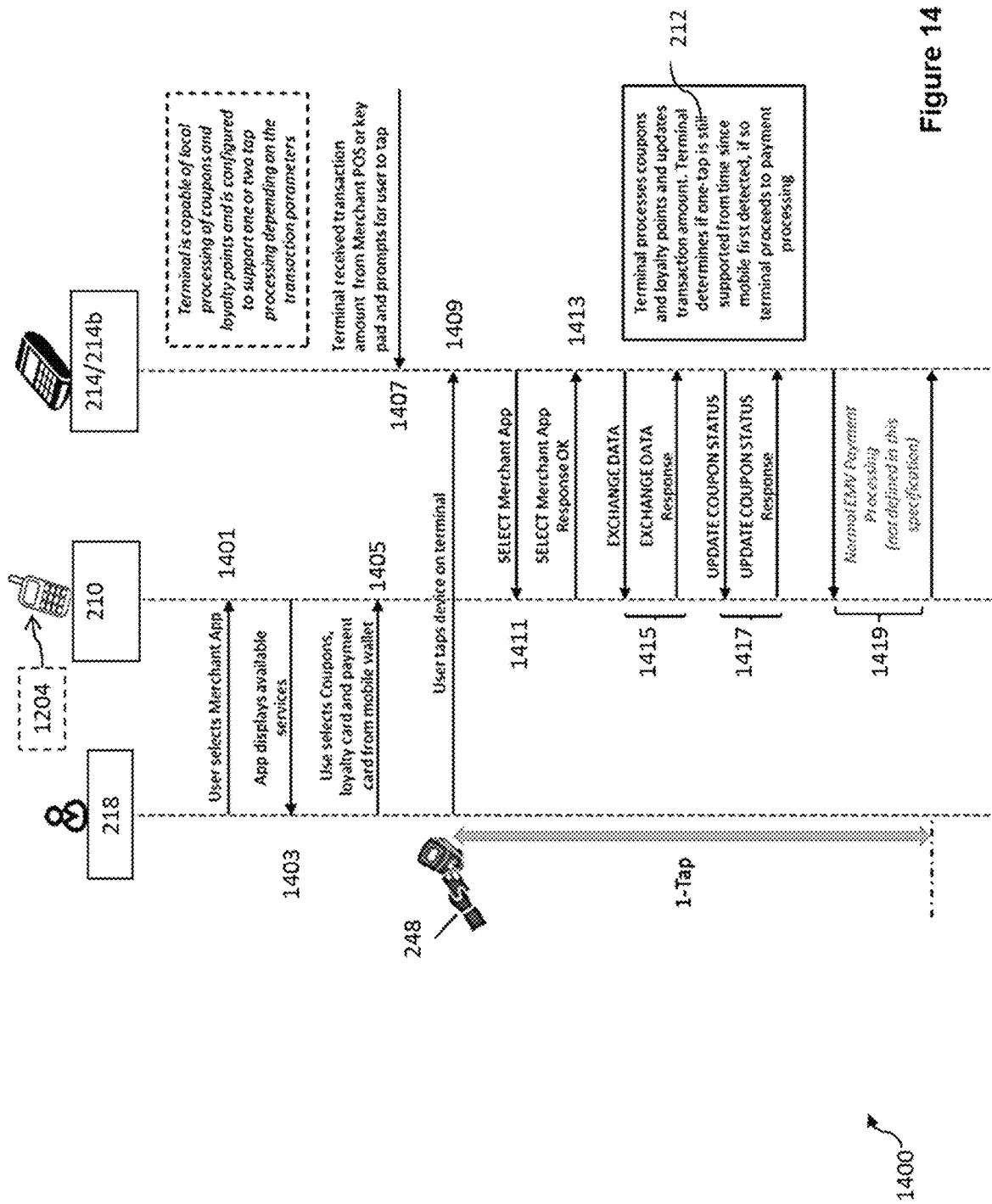
FIG. 14 shows the flow of command exchanges in accordance with implementing a "One-Tap" process for the architecture shown in FIG. 12.

FIG. 14 shows the flow 1400 of command exchanges in accordance with implementing a "One-Tap" process for the architecture shown in FIG. 12 applied to a network as shown in FIG. 7. The components involved in FIG. 14 are the same as those described with respect to FIGS. 2 to 5, i.e. a mobile terminal 210 (operated by a user 218) and a receiving terminal 214. A server 212, that administers a communication link 216 over which transaction data is transmitted between the mobile terminal 210 and the receiving terminal 214, is schematically shown next to the portion of the flow 1400 where there is interaction with the server 212. Further, the flow 1400 may require only the payment terminal 214*b* (see FIGS. 7 to 9) of the receiving terminal 214.

In step 1401, the user 218 selects a merchant application or redemption application 1204 which is able to redeem the desired value added service. The selected redemption application 1204 then returns 1403 a list of available options that initiates the redemption of the selected value added service. These options include a list of coupons, offers and loyalty program points that when selected may, for example, provide a discount on a good that is to be purchased. After the user 218 has selected 1405 the desired value added service for redemption, the redemption application 1204 is then ready to communicate with the receiving terminal 214.

In the implementation shown in FIG. 14, the receiving terminal 214 indicates 1407 its readiness to process data transmitted by the mobile terminal 210 by having received data on the transaction amount and prompting the user 218 to tap or place the mobile terminal 210 in proximity to the receiving terminal 214. Communication between the receiving terminal 214 and the mobile terminal 210 may be via a NFC protocol 248. After the user 218 taps 1409 the mobile terminal 210 to the receiving terminal 214, the receiving terminal 214 then executes a "Select Application" command, where the receiving terminal 214 detects 1411 for the operation of the selected redemption application 1204. The mobile terminal 210 then responds 1413 to the receiving terminal 214 upon confirmation that handshaking has occurred between the receiving terminal 214 and the mobile terminal 210, which establishes a communication channel between the two devices.

In step 1415, an "Exchange Data" command is executed over the communication channel established in the step 1413, where data is exchanged between the receiving terminal 214 and the mobile terminal 210 that facilitates the redemption of the value added services. As described above with reference to FIG. 12, the redemption of the value added services is facilitated by the bridging application 1206 hosted in the mobile terminal 210 and the VAS kernel accessed by the processing application hosted in the receiving terminal 214. After this exchange of data, an "Update Coupon Status" command is executed in step 1417 over the communication channel established in the step 1413, where data is exchanged between the receiving terminal 214 and the mobile terminal 210 that updates records stored in either or both of the receiving terminal 214 and the mobile terminal 210, these records being related to the management of the value added services, such as updating a balance of a loyalty account or that a limited use coupon has been fully redeemed and is thus no longer available.

The completion of step 1417 marks the completion of the data exchange between the receiving terminal 214 and the mobile terminal 210 in respect of redemption of value added services. Data exchange which facilitates payment of the purchased goods and/or services then occurs in step 1419, where this payment is made possible through a digital wallet application 210*d* (see FIGS. 7 to 9) installed in the mobile terminal 210.

Figure 15:
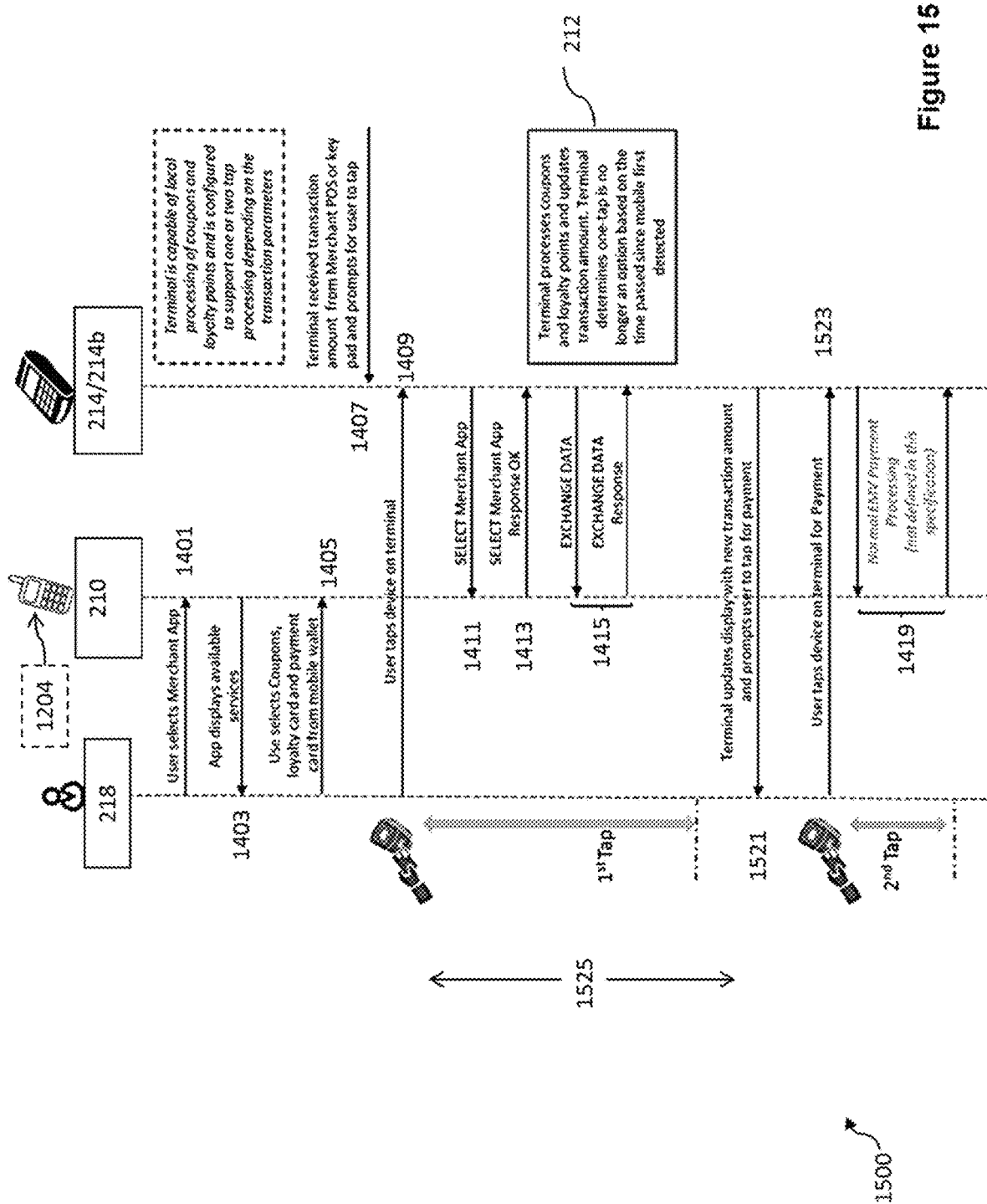
FIG. 15 shows the flow of command exchanges in accordance with implementing a "Two-Tap" process for the architecture shown in FIG. 12.

FIG. 15 shows the flow 1500 of command exchanges in accordance with implementing a "Two-Tap" process for the architecture shown in FIG. 12 applied to a network as shown in FIG. 7. As in FIG. 14, the components involved in FIG. 15 are the same as those described with respect to FIGS. 2 to 5, i.e. a mobile terminal 210 (operated by a user 218) and a receiving terminal 214. A server 212, that administers a communication link 216 over which transaction data is transmitted between the mobile terminal 210 and the receiving terminal 214, is schematically shown next to the portion of the flow 1500 where there is interaction with the server 212. Further, the flow 1500 may require only the payment terminal 214b (see FIGS. 7 to 9) of the receiving terminal 214. The differences between the process flow 1500 of FIG. 15 and the process flow 1400 of FIG. 14 are described below.

In the "Two-Tap" process of FIG. 15, there is no execution of an "Update Coupon Status" command. At the end of step 1415, an updated transaction amount (which results from the redemption of the value added service on the original transaction cost) is displayed 1521 to the user 218, along with a prompt for the user 218 to tap the mobile terminal 210 against the receiving terminal 214 so as to proceed with payment of the updated transaction amount. The user 218 may then initiate a digital wallet application 210d (see FIGS. 7 to 9) to make this payment, wherein the initiation of this digital wallet application 210d is detected at step 1523 when the mobile terminal 210 is tapped against the receiving terminal 214. Data sent by the receiving terminal 214, which facilitates payment of the purchased goods and/or services, is then exchanged between the receiving terminal 214 and the mobile terminal 210.

The "Two-Tap" process 1500 of FIG. 15 may be initiated in response to the receiving terminal 214 detecting that time interval 1525 is too long for implementation of the "One-Tap" process 1400 of FIG. 14 to be feasible. However the "Two-Tap" process may also be employed if the receiving terminal 214 is not configured to be able to perform the "One-Tap" process 1400 of FIG. 14.

Figure 16:
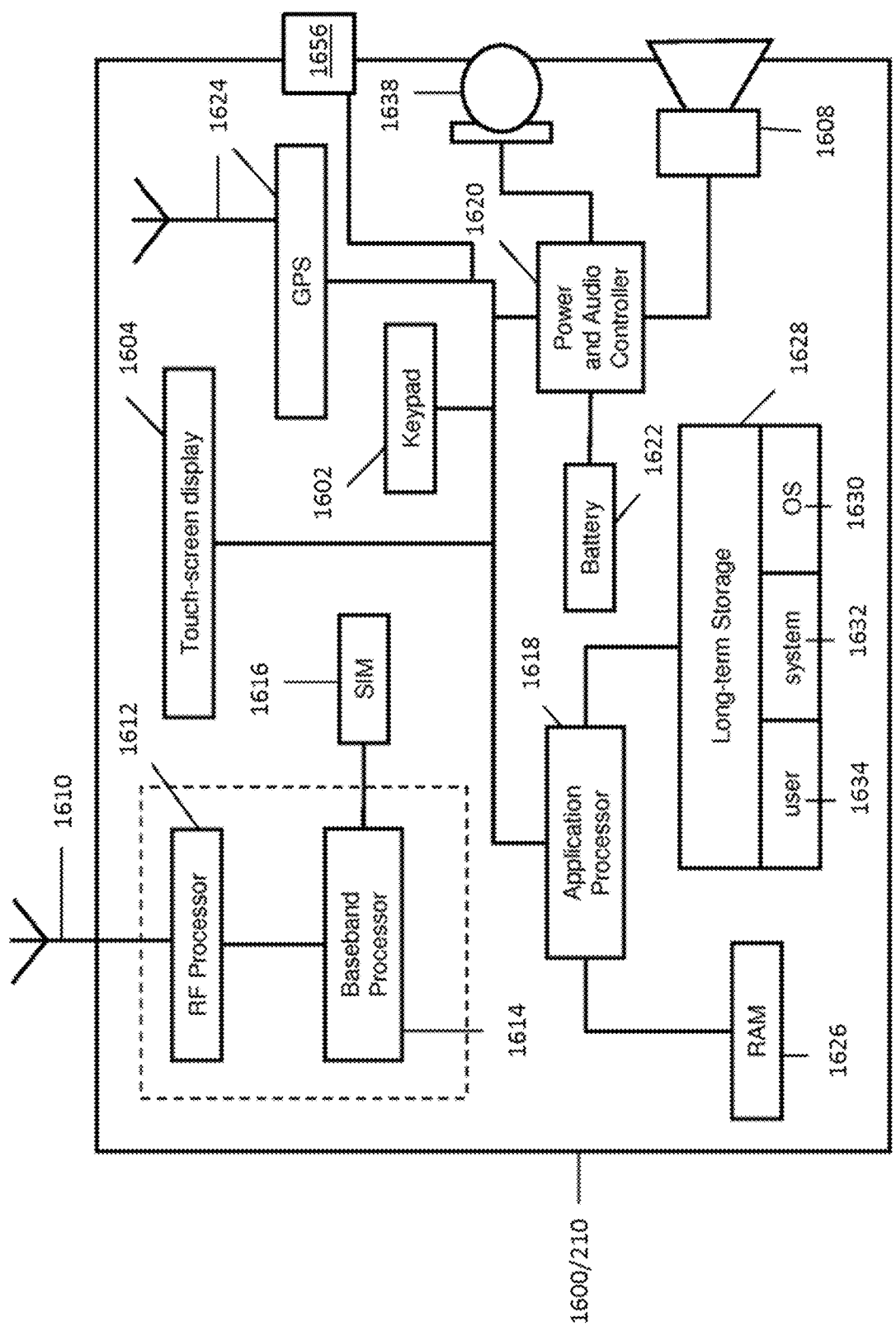
FIG. 16 is a schematic of a wireless device used to implement the mobile terminal shown in FIGS. 2 to 10 and 12.

FIG. 16 is a schematic of a wireless device 1600 that may be utilized to implement the mobile terminal 114, 210 shown in FIGS. 1D and 2 to 10 and 12. The wireless device 1600 may be in communication (e.g. through NFC or via a OR code) with the receiving terminal 114, 214.

The wireless device 1600 comprises a keypad 1602, a touch-screen 1604, a microphone 1638, a speaker 1608 and an antenna 1610. The wireless device 1600 is capable of being operated by a user to perform a variety of different functions, such as, for example, hosting a telephone call, sending an SMS message, browsing the Internet, sending an email and providing satellite navigation.

The wireless device 1600 comprises hardware to perform communication functions (e.g. telephony, data communication), together with an application processor and corresponding support hardware to enable the wireless device have other functions, such as, messaging, Internet browsing, email functions and the like. The communication hardware is represented by the RF processor 1612 which provides an RF signal to the antenna 1610 for the transmission of data signals, and the receipt therefrom. Additionally provided is a baseband processor 1614, which provides signals to and receives signals from the RF Processor 1612. The baseband processor 1614 also interacts with a subscriber identity module 1616, as is well known in the art. The communication subsystem enables the wireless device 1600 to communicate via a number of different communication protocols including 3G, 4G, GSM, WiFi, Wi-fi direct, Near Field Communication (NFC), Bluetooth™ and/or CDMA.

The keypad 1602 and the touch-screen 1604 are controlled by an application processor 1618. A power and audio controller 1620 is provided to supply power from a battery 1622 to the communication subsystem, the application processor 1618, and the other hardware. The power and audio controller 1620 also controls input from the microphone 1638, and audio output via the speaker 1608. Also provided is a global positioning system (GPS) antenna and associated receiver element 1624 which is controlled by the application processor 1618 and is capable of receiving a GPS signal for use with a satellite navigation functionality of the wireless device 1600.

In order for the application processor 1618 to operate, various different types of memory are provided. Firstly, the wireless device 1600 includes Random Access Memory (RAM) 1626 connected to the application processor 1618 into which data and program code can be written and read from at will. Code placed anywhere in RAM 1626 can be executed by the application processor 1618 from the RAM 1626. RAM 1626 represents a volatile memory of the wireless device 1600.

Secondly, the wireless device 1600 is provided with a long-term storage 1628 connected to the application processor 1618. The long-term storage 1628 comprises three partitions, an operating system (OS) partition 1630, a system partition 1632 and a user partition 1634. The long-term storage 1628 represents a non-volatile memory of the wireless device 1600.

In the present example, the OS partition 1630 contains the firmware of the wireless device 1600 which includes an operating system. Other computer programs may also be stored on the long-term storage 1628, such as application programs, and the like. In particular, application programs which are mandatory to the wireless device 1600, such as, in the case of a smartphone, communications applications and the like are typically stored in the system partition 1632. The application programs stored on the system partition 1632 would typically be those which are bundled with the wireless device 1600 by the device manufacturer when the wireless device 1600 is first sold. Application programs which are added to the wireless device 1600 by the user would usually be stored in the user partition 1634.

As stated, the representation of FIG. 16 is schematic. In practice, the various functional components illustrated may be substituted into one and the same component. For example, the long-term storage 1628 may comprise NAND flash, NOR flash, a hard disk drive or a combination of these.

The wireless device 1600 may also have an image capturing module 1656. The image capturing module, together with a suitable application, may be used to capture/scan OR codes and process the data embedded in the OR code.

With reference to FIG. 12, the mobile terminal 114, 210 can have installed the plurality of redemption applications 1204 configured to facilitate the redemption of the value added services. To facilitate this redemption of value added services, the at least one processor (e.g. application processor 1618) and the at least one memory (e.g. RAM 1626, long-term storage 1628) with its computer program code are configured to cause the mobile terminal 210 at least to detect for the presence of the receiving terminal 116, 214 through which mobile terminal data can be transmitted and the mobile terminal data is then processed through the server 118 at the VAS provider 120 before redemption information in the form of one or more transaction modifiers is sent to the receiving terminal 116, 214 for modifying transaction credentials of the transaction taking place. Where a bridging application is used, the at least one memory and the computer program code are further configured to, with the at least one processor, activate, at the mobile terminal 210, the bridging application 1206 instituting a set of commands used by the plurality of redemption applications 1204 and the processing application to transmit and receive the data 1208 that facilitates the redemption of the value added services. FIG. 17 shows a schematic of a data packet 1700 that results from performing authentication of the mobile terminal 114, 210 (see FIGS. 1D and 2 to 5) before exchange of transaction data relating to the redemption of value added services. The authentication code that the receiving terminal 116, 214 receives from the mobile terminal 114, 210 is represented using reference numeral 1702, while the authentication code generated by the receiving terminal 214 is represented using reference numeral 1704. Computation of the match between the authentication code 1702 received from the mobile terminal 114, 210 and the authentication code 1704 generated by the receiving terminal 116, 214 may be performed using a 3DES algorithm in CBC (cyclic block chaining mode) mode. In FIG. 17, this 3DES algorithm is based on ISO/IEC 9797-1 Algorithm 3, which follows a sequence 1706 of data transformations shown in FIG. 17, wherein the implementation of this sequence 1706 is appreciated by those skilled in the art. The sequence 1706 may begin with an initial vector 1708 of 8 bytes of all zeros while the computation results in a secret key 1710 of 16 bytes that is shared between the VAS kernel in the receiving terminal 116, 214 and the plurality of redemption applications 1204 hosted in the mobile terminal 210.

Figure 18:
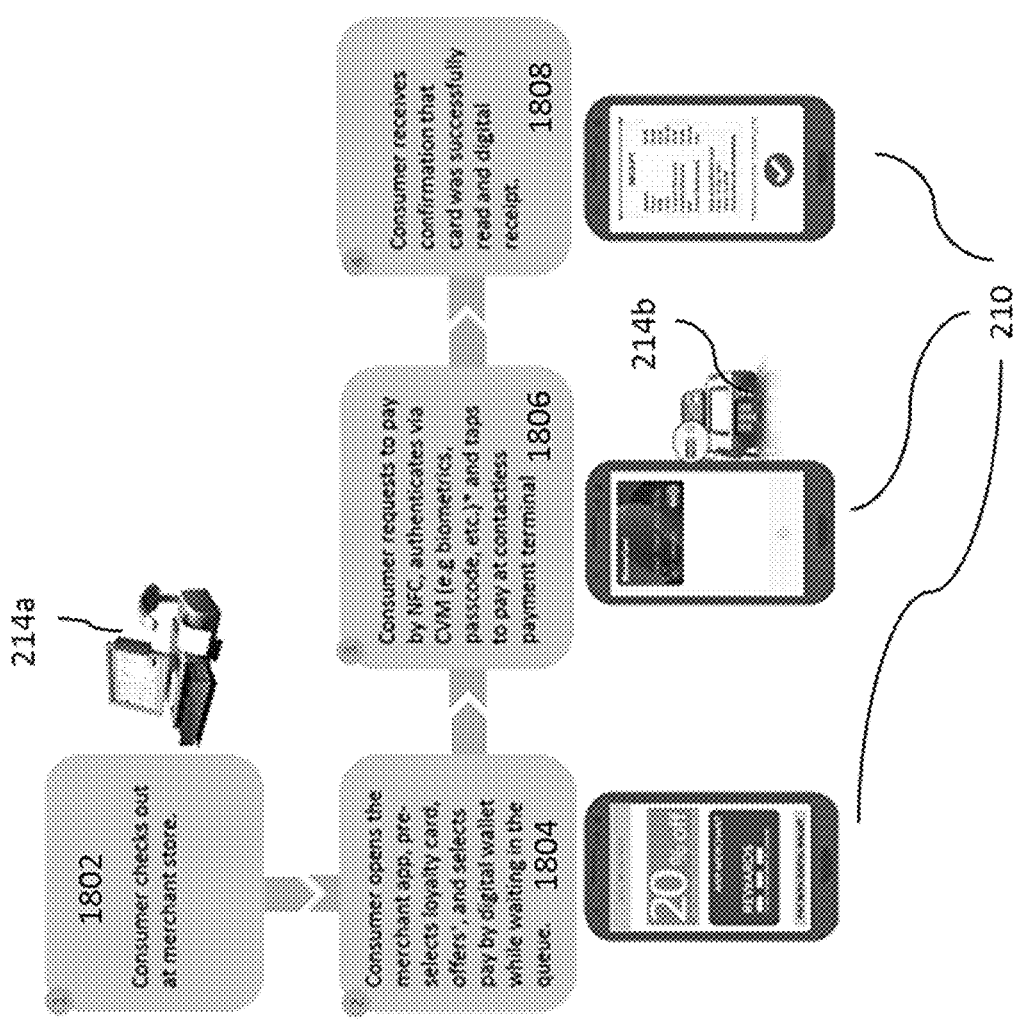
FIG. 18 illustrates an overview of the "One-Tap" experience shown in FIG. 14.

FIG. 18 illustrates an overview of the "One-Tap" experience shown in FIG. 14.

At step 1802, a customer checks out at a POS terminal 214*a*. At step 1804, while waiting in the queue, the customer can open a merchant application installed in a mobile terminal 114, 210 to preselect a loyalty card or offer that is used to redeem a desired value added service. The customer can also select a payment card registered in a digital wallet application in the mobile terminal 114, 210 to make payment. At step 1806, the customer then taps the mobile terminal 114, 210 against the receiving terminal 116, 214 to redeem the selected value added service and make payment. In step 1808, the mobile terminal 114, 210 receives confirmation of successful redemption of the value added service and a digital receipt of the payment made using the digital wallet application.

Figure 19:
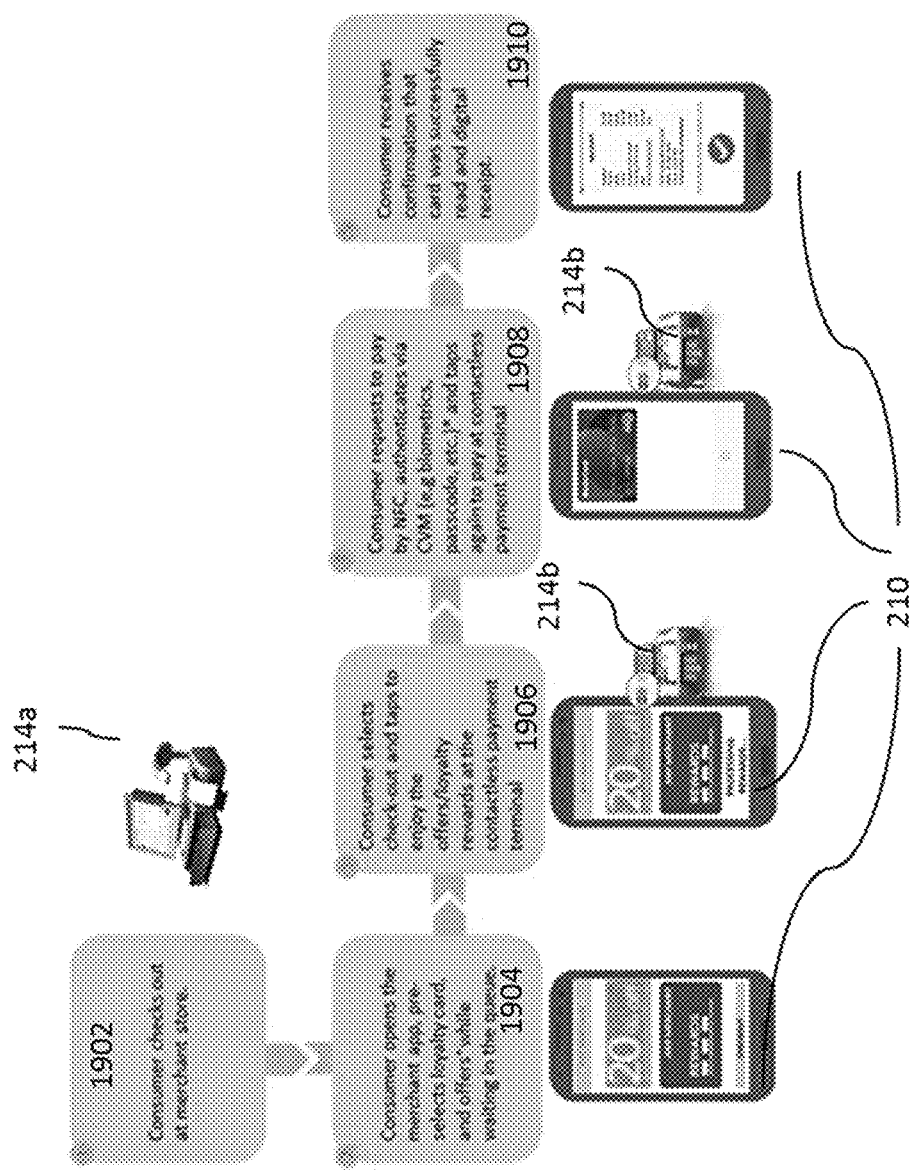
FIG. 19 illustrates an overview of the "Two-Tap" experience shown in FIG. 15.

FIG. 19 illustrates an overview of the "Two-Tap" experience shown in FIG. 15.

At step 1902, a customer checks out at a POS terminal 214*a*. At step 1904, while waiting in the queue, the customer can open a merchant application installed in a mobile terminal 114, 210 to preselect a loyalty card or offer that is used to redeem a desired value added service. At step 1906, the customer performs a first tap of the mobile terminal 114, 210 against the receiving terminal 116, 214 to redeem the selected value added service. In step 1908, the mobile terminal 114, 210 receives confirmation of successful redemption of the value added service. The customer then selects a payment card registered in a digital wallet application in the mobile terminal 114, 210 and performs a second tap of the mobile terminal 114, 210 to make payment. In step 1910, the mobile terminal 114, 210 receives a digital receipt of the payment made using the digital wallet application.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for modifying transaction credentials, comprising:
    initiating, by a mobile device of a computer network system, a transaction at a point-of-sale terminal of a merchant of the computer network system, the transaction being defined by one or more transaction credentials;
    transmitting mobile terminal data from the mobile terminal, via the point-of-sale terminal, to a server of the computer network system, the mobile terminal data comprising a set of account data relating to the mobile terminal,
        wherein the server includes an integration controller enabling the server to serve as an intermediary between the point-of-sale terminal and a plurality of third-party value-added service (VAS) providers,
        wherein the point-of-sale terminal does not perform processing on the mobile terminal data comprising the set of account data for enabling involvement of the third-party VAS providers' services, and
        wherein the merchant is not required to incorporate additional physical or virtual infrastructure;
    extracting, by the server of the computer network system, the set of account data at least partially from the mobile terminal data;
    identifying, by the server, a third-party VAS provider of the computer network system, from the plurality of third-party VAS providers, on a basis of the set of account data extracted from the mobile terminal data;
    formatting, by the integration controller of the server, the set of account data into a format that is usable for the identified third-party VAS provider, the set of account data being associated with a unique consumer account managed by the third-party VAS provider;
    transmitting, by the server, the formatted set of account data from the server to the identified third-party VAS provider, whereat one or more transaction modifiers associated with the consumer account is identified;
    receiving, at the point-of-sale terminal, from the third-party VAS provider, via the server, the one or more transaction modifiers associated with the consumer account; and
    modifying, by the point-of-sale terminal, at least one of the one or more transaction credentials based on the one or more transaction modifiers.

2. The method of claim 1, further comprising executing the transaction using the one or more modified transaction credentials.

3. The method of claim 1, wherein the mobile terminal data comprises a plurality of data points and extracting the set of account data comprises identifying account data, from the plurality of data points, required by the third-party VAS provider for identifying, and authorising access to, the consumer account.

4. The method of claim 3, wherein transmitting the set of account data comprises transmitting the set of account data from the server to the third-party VAS provider.

5. The method of claim 1, wherein the mobile terminal data is configured by an app and the step of transmitting mobile terminal data comprises transmitting mobile terminal data in response to activation of an app at the mobile terminal, the app relating to the point-of-sale terminal.

6. The method of claim 1, wherein the transaction modifiers are stored in the consumer account and receiving the one or more transaction modifiers comprises receiving, by the POS terminal, the one or more transaction modifiers from the third party VAS provider.

7. The method of claim 1, wherein one of the transaction credentials comprises a ticket amount and modifying at least one of the one or more transaction credentials comprises applying, by the POS terminal, a discount to the ticket amount.

8. The method of claim 1, wherein the one or more transaction modifiers comprise one or more value-added services and modifying at least one of the one or more transaction credentials based comprises applying, by the POS terminal, the one or more value-added services to the transaction credentials.

9. The method of claim 1, wherein the consumer account is configured to accumulate rewards points and modifying at least one of the one or more transaction credentials comprises associating a particular number of rewards points with the transaction such that, upon executing the transaction, the particular number of rewards points are credited to the consumer account.

10. The method of claim 1, wherein the set of account data comprises one or more data points, the method further comprising sending additional data from the point-of-sale terminal to the server and extracting, by the server, at least one of the one or more data points from the additional data.

11. A system for modifying transaction credentials, comprising a plurality of point-of-sale (POS) terminals, receiving terminal and a server, and a plurality of third-party value-added service (VAS) providers:
the server comprising:
at least one server processor;
an integration controller enabling the server to serve as an intermediary between a POS terminal of a merchant and the plurality of third-party VAS providers,
at least one server memory including server computer program code;
the at least one server memory and the server computer program code configured to, with the at least one processor, cause the server at least to:
receive mobile terminal data from a mobile terminal, via a POS terminal, from the plurality of POS terminals, the mobile terminal data comprising a set of account data relating to the mobile terminal, wherein the POS terminal of the merchant does not perform processing on the mobile terminal data comprising the set of account data for enabling involvement of the third-party VAS providers' services, and
wherein the merchant is not required to incorporate additional physical or virtual infrastructure;
extract a set of account data at least partially from the mobile terminal data at the server;
identify a third-party VAS provider, from the plurality of third-party VAS providers, on a basis of the set of account data extracted from the mobile terminal data;
formatting, via the integration controller of the server, the set of account data into a format that is usable for the identified third-party VAS provider, the set of account data being associated with a unique consumer account managed by the third-party VAS provider;
transmit the set of account data to the identified third-party VAS provider, whereat one or more transaction modifiers associated with the consumer account is identified; and
receive from the third-party VAS provider, and forward to the point-of-sale terminal, one or more transaction modifiers associated with the consumer account; and
the point-of-sale terminal comprising:
at least one point-of-sale terminal processor; and
at least one point-of-sale terminal memory including point-of-sale terminal computer program code;
the at least one point-of-sale terminal memory and the point-of-sale terminal computer program code configured to, with the at least one point-of-sale terminal processor, cause the point-of-sale terminal at least to:
initiate a transaction defined by one or more transaction credentials;
receive the mobile terminal data from the mobile terminal and transmit the mobile terminal data to the server;
receive the one or more transaction modifiers from the third-party VAS provider, via the server; and
modify at least one of the one or more transaction credentials based on the one or more transaction modifiers.

12. The system of claim 11, wherein the point-of-sale terminal computer program code is further configured to, with the at least one point-of-sale terminal processor, cause the point-of-sale terminal to execute the transaction using the one or more modified transaction credentials.

13. A server, of a computer network system, facilitating modification of transaction credentials, the server configured to communicate with a plurality of point-of-sale (POS) terminals at which transactions are initiated and to communicate with a plurality of third-party value-added service (VAS) providers, wherein the transactions are defined by the transaction credentials, the server comprising:
a processor;
an integration controller enabling the server to serve as an intermediary between the plurality of POS terminals and the plurality of third-party VAS providers; and
at least one memory including computer program code, the at least one memory and the computer program code configured to, with the at least one processor, cause the server at least to:
receive mobile terminal data from a mobile terminal, via a POS terminal, from the plurality of POS terminals, the mobile terminal data comprising a set of account data relating to the mobile terminal,
wherein the POS terminal does not perform processing on the mobile terminal data comprising the set of account data for enabling involvement of the third-party VAS providers' services, and
wherein the merchant is not required to incorporate additional physical or virtual infrastructure;
extract a set of account data at least partially from the mobile terminal data at the server, and identify a third-party VAS provider, from the plurality of third-party VAS providers, associated with the account data, the third-party VAS provider managing a unique consumer account associated with the set of account data;
format, via the integration controller, the set of account data into a format that is usable for the identified third-party VAS provider;
transmit the formatted set of account data to the third-party VAS provider, whereat one or more transaction modifiers associated with the consumer account is identified; and receive, from the third-party VAS provider, and forward to the POS terminal, one or more transaction modifiers associated with the consumer account, causing the POS terminal to modify the transaction credentials based on the one or more transaction modifiers.

14. A non-transitory computer readable medium having stored thereon executable instructions to have a server and a point-of-sale terminal of a merchant facilitate modification of transaction credentials, the server including an integration controller enabling the server to serve as an intermediary between the point-of-sale terminal and a plurality of third-party value-added service (VAS) providers, the executable instructions controlling the server to perform steps comprising:

receiving mobile terminal data from a mobile terminal, via a point-of-sale terminal, the mobile terminal data comprising a set of account data relating to the mobile terminal,
  wherein the point-of-sale terminal does not perform processing on the mobile terminal data comprising the set of account data for enabling involvement of the third-party VAS providers' services, and
  wherein the merchant is not required to incorporate additional physical or virtual infrastructure;
extracting a set of account data at least partially from the mobile terminal data;
identifying a third-party VAS provider, from the plurality of third-party VAS providers, on a basis of the set of account data extracted from the mobile terminal data;
formatting, by the integration controller, the set of account data into a format that is usable for the identified third-party VAS provider, the set of account data being associated with a unique consumer account managed by the third-party VAS provider;
transmitting the formatted set of account data to identified third-party VAS provider, whereat one or more transaction modifiers associated with the consumer account is identified; and
receiving from the third-party VAS provider, and forwarding to the point-of-sale terminal, one or more transaction modifiers associated with the consumer account,
the executable instructions controlling the point-of-sale terminal to perform steps comprising:
  initiating a transaction defined by one or more transaction credentials;
  receiving the mobile terminal data from the mobile terminal and transmit the mobile terminal data to the server;
  receiving the one or more transaction modifiers from the third-party VAS provider via the server; and
  modifying, in response to the receiving of the one or more transaction modifiers, at least one of the one or more transaction credentials based on the one or more transaction modifiers.

15. The computer readable storage medium of claim 14, comprising at least one memory located at the point-of-sale terminal and at least one memory located at the server.

* * * * *